United States Patent
Nakanishi et al.

(10) Patent No.: US 7,397,454 B2
(45) Date of Patent: Jul. 8, 2008

(54) LIQUID CRYSTAL DISPLAY PANEL DEVELOPMENT METHOD

(75) Inventors: Yohei Nakanishi, Kawasaki (JP); Hidefumi Yoshida, Kawasaki (JP); Takashi Sasabayashi, Kawasaki (JP); Yasutoshi Tasaka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 94 days.

(21) Appl. No.: 11/521,778

(22) Filed: Sep. 15, 2006

(65) Prior Publication Data

US 2007/0008476 A1 Jan. 11, 2007

Related U.S. Application Data

(62) Division of application No. 11/312,912, filed on Dec. 20, 2005, now Pat. No. 7,136,131, which is a division of application No. 10/747,517, filed on Dec. 29, 2003, now Pat. No. 7,095,473, which is a division of application No. 09/927,005, filed on Aug. 9, 2001, now Pat. No. 6,819,384.

(30) Foreign Application Priority Data

Oct. 31, 2000 (JP) .............................. 2000-331570

(51) Int. Cl.
G09G 3/36 (2006.01)
(52) U.S. Cl. .......................................... 345/87; 345/94
(58) Field of Classification Search ........... 345/87–100, 345/204
See application file for complete search history.

(56) References Cited

U.S. PATENT DOCUMENTS

| 6,341,003 | B1 | 1/2002 | Ashizawa et al. |
| 6,421,039 | B1 * | 7/2002 | Moon et al. .................. 345/100 |
| 6,512,565 | B1 | 1/2003 | Lee et al. |
| 6,525,798 | B1 | 2/2003 | Yamakita et al. |
| 6,583,840 | B1 | 6/2003 | Inoue et al. |
| 6,784,967 | B2 | 8/2004 | Ko et al. |
| 6,950,167 | B2 | 9/2005 | Matsumoto et al. |

FOREIGN PATENT DOCUMENTS

| JP | 8-220518 | 8/1996 |
| JP | 11-167126 A | 6/1999 |
| KR | 1999-0033781 | 5/1999 |
| KR | 1999-0079777 | 11/1999 |
| KR | 2000-0007972 | 2/2000 |
| WO | WO 96/00408 | 1/1996 |

\* cited by examiner

*Primary Examiner*—Regina Liang
(74) *Attorney, Agent, or Firm*—Greer, Burns, & Crain, Ltd.

(57) ABSTRACT

A liquid crystal panel development method for a panel including first and second substrates and first and second electrodes with a display voltage applied to liquid crystal interposed therebetween. The method involves applying a voltage signal between the electrodes with an AC voltage component of amplitude Vac and a DC voltage component Vdc, changing Vac and Vdc to measure the range of optimal DC component variation $\Delta$Vdc, and determining a structure or material of the liquid crystal panel such that the range of optimal DC component variation $\Delta$Vdc becomes less than a given value. $\Delta$Vdc=|Vdcb —Vdcw|, where Vdcb is the Vdc value at the minimum range of transmittance variation when Vdc is changed with Vac being fixed for displaying black, and Vdcw is the Vdc value at the minimum range of transmittance variation when Vdc is changed with Vac being fixed for displaying white.

2 Claims, 37 Drawing Sheets

(A)  FOR 48 HOURS (B)  Bmw | Bmb $$\text{PERSISTENCE DEGREE} = 100 \times \frac{Bmw - Bmb}{Bm}$$

BACKLIGHT

LIQUID CRYSTAL DISPLAY PANEL DEVELOPMENT METHOD

This is a divisional of application Ser. No. 11/312,912, filed Dec. 20, 2005, now U.S. Pat. No. 7,136,131, which is a divisional of application Ser. No. 10/747,517, filed Dec. 29, 2003, now U.S. Pat. No. 7,095,473, which prior application was a divisional of application Ser. No. 09/927,005, filed Aug. 9, 2001, now U.S. Pat. No. 6,819,384.

BACKGROUND OF THE INVENTION

1. Field of the Invention

The present invention relates to a liquid crystal display (LCD) panel capable of reducing a persistence degree and a development method thereof.

2. Description of the Related Art

Each of FIGS. 31 and 32 is a schematic sectional view showing a structure of one pixel of an LC panel. FIG. 31 shows a state where no voltage is applied, and FIG. 32 shows a state where a voltage is applied.

The LCD panel includes substrates 10 and 20 opposing to each other, and a sealed-in nematic liquid crystal 30 having an anisotropic dielectric positive constant. In the substrate 10, a flat electrode 12, a dielectric layer 13 and a vertically oriented layer 14 are formed on a face of a transparent insulating substrate 11, for example, a glass substrate, and on the other face thereof, a polarizer 15 is formed. In the substrate 20, a common electrode 23 is formed on one face of a transparent substrate 21, for example, a glass substrate, an insulating layer 24 is formed thereon, a pixel electrode 25 is formed on the insulating layer 24, and further an insulating layer 26 and a vertically orientated later 27 are formed thereon. On the other face of the substrate 21, a polarizer 28 is formed. Transmission axes of the polarizers 15 and 28 perpendicularly cross over each other.

When backlight in the direction shown by arrows in FIG. 31 enters into the LCD panel, the light is transformed into linearly polarized light by the polarizer 28. When the flat electrode 12, the common electrodes 23 and the pixel electrode have the same potential, the liquid crystal 30 effects no change in the plane of polarization of the linearly polarized light, and therefore the linearly polarized light cannot be transmitted through the polarizer 15, resulting in a dark state.

When, as shown in FIG. 32, the flat electrode 12 and the common electrode 23 has the same potential but the pixel electrode 25 is applied with a potential different from the both former electrodes, an electric field arises. Dotted lines of FIG. 32 show the lines of electric force. Liquid crystal molecules are inclined relative to an incident light direction under influence of the electric field to cause birefringence, and part of the light can transmit through the polarizer 15, resulting in a bright state.

Since the common electrode 23 and the pixel electrode 25 are made of an opaque metal, behaviors of liquid crystal molecules over the electrodes are not problematic in terms of display.

If the flat electrode 12 does not exist, liquid crystal molecules between the pixel electrode and the common electrode 23 tend to reduce inclination thereof, which will produces the drop region of transmittance. The flat electrode 12 makes the electric field between the common electrode 23 and the pixel electrode 25 asymmetric so as to contributes to prevent the transmittance from locally dropping. The dielectric layer 13 reinforces the lateral component of the electric field in the liquid crystal 30 to make it possible for the liquid crystal 30 to be driven with lower applied voltage. The common electrode 23 and the pixel electrode 25 each are stripe electrodes extending in the direction perpendicular to the sheet of FIG. 32, and alternately formed on the top and bottom surfaces of the insulting layer 24. The insulating layer 24 is for preventing common electrodes and pixel electrodes from short-circuiting at positions where the both overlap as will be described later. The insulating layer 26 is for reducing the persistence degree.

FIG. 33 shows an electrode pattern of one pixel, formed in the substrate 20 of FIG. 31. FIGS. 34 and 35 are patterns of the pixel electrode 25 and the common electrode 23, respectively, of FIG. 33.

In FIG. 33, a data line DL1 and a scan line SL1 cross over each other with an insulating layer interposing therebetween. Each of the pixel electrode 25 and the common electrode 23 has a stripe section and a peripheral section connecting ends of the stripe section. The lines of the stripe section are inclined 45 degrees to each of the scan line SL1 and the data line DL1.

When the potential of the scan line SL1 goes high, a TFT 29 is turned on to apply the potential of the data line DL1 onto the pixel electrode 25 and generate an electric field between the stripe electrodes of the pixel electrode 25 and the common electrode 23. The longitudinal direction of the upper half of the stripe electrodes is different from that of the lower half of the stripe electrodes by 90 degrees as shown in FIG. 33, whereby the LCD panel has wider range of viewing angles than in a case where the both halves of the stripe electrodes are parallel to each other.

The common electrode 23A has peripheral protrusions which are connected to the common electrodes of adjacent pixels not shown.

FIG. 36(A) is an enlarged partial view near a crossover of a stripe electrode and the peripheral section of FIG. 33. FIG. 36(B) shows the lines of electric force with dotted lines near the crossover when a voltage is applied between the pixel electrode 25 and the common electrode 23.

A peripheral section of the pixel or common electrode has crossover portions to stripe electrodes of the common or pixel electrodes with the insulating layer interposing therebetween since a pixel has a rectangular shape, and each of the pixel electrode 25 and the common electrode 23 has stripe electrodes in parallel to each other and has a continuous shape. For example, a side 251 of the pixel electrode 25 is connected to a side 252 of the peripheral section, and a side 231 of the common electrode 23 is parallel to the side 251, while the side 231 crosses over the side 252 at an acute angle.

FIG. 37 is a schematic sectional view showing inclination of liquid crystal molecules between the pixel electrode 25 and the common electrode 23 of one pixel of the LCD panel when a voltage is applied therebetween.

In FIG. 32, a structure between the pixel electrode 25 and the liquid crystal 30 is different from that between the common electrode 23 and the liquid crystal 30, which causes persistence.

In FIG. 36(B), since the side 252 crosses over the side 231 at an acute angle, an electric field therebetween near the crossover is stronger than that between the parallel sides. Further, a direction of electric field strength near the crossover is different from that between the parallel sides. Due to such conditions, a transmittance-voltage characteristic near the crossover is different from that between the parallel portion, causing not only degradation of an image quality but also persistence.

In FIG. 37, since the insulating layer 26 exists above the pixel electrode 25, application of an electric field in this portion is useless and effective application of the electric field to the liquid crystal 30 is prevented. If the insulating layer 26 is omitted in order to solve this problem, it causes more persistence since the insulating resistance of the vertically oriented layer 27 is low. If the pixel electrode 25 is exposed to the liquid crystal 30, not only is the degree of persistence enhanced, but liquid crystal molecules also decompose. Further, since the top surface of a pixel electrode 25 is flat, it is not possible to effectively apply an electric field to the liquid crystal 30 in relation to transmittance, which prevents achieving higher contrast display.

In development of an LCD panel, measurement of a persistence degree is performed at each trial when a structure or material of the LCD panel is changed in order to reduce the persistence degree to a value lower than a given value, and it takes, for example, 48 hours to measure the persistence degree in each trial, which makes a development term thereof longer.

SUMMARY OF THE INVENTION

Accordingly, it is an object of the present invention to provide a liquid crystal display panel capable of reducing a persistence degree.

In one aspect of the present invention, there is provided a liquid crystal panel comprising: first and second substrate; and liquid crystal interposed between the first and second substrates; the first substrate comprising: an insulating substrate; first and second electrodes, formed over the insulating substrate, for a display voltage to be applied therebetween; and a first insulating layer covering the first and second electrodes; wherein the first electrode is disposed higher than the second electrode in relation to a direction from the insulating substrate toward the second substrate, and the first and second electrodes overlap each other with a second insulating layer being interposed therebetween at an overlapping portion, wherein a thickness of the first insulating layer on the first electrode is substantially equal to the insulating layer on the second electrode.

With this configuration, when the voltage signal is applied between the first and second electrodes, electric states over the first and second electrodes are almost the same, whereby persistence is reduced in comparison with a case where the thicknesses are different from each other as shown in FIG. 31.

Other aspects, objects, and the advantages of the present invention will become apparent from the following detailed description taken in connection with the accompanying drawings.

DESCRIPTION OF THE PREFERRED EMBODIMENTS

Figure 1:
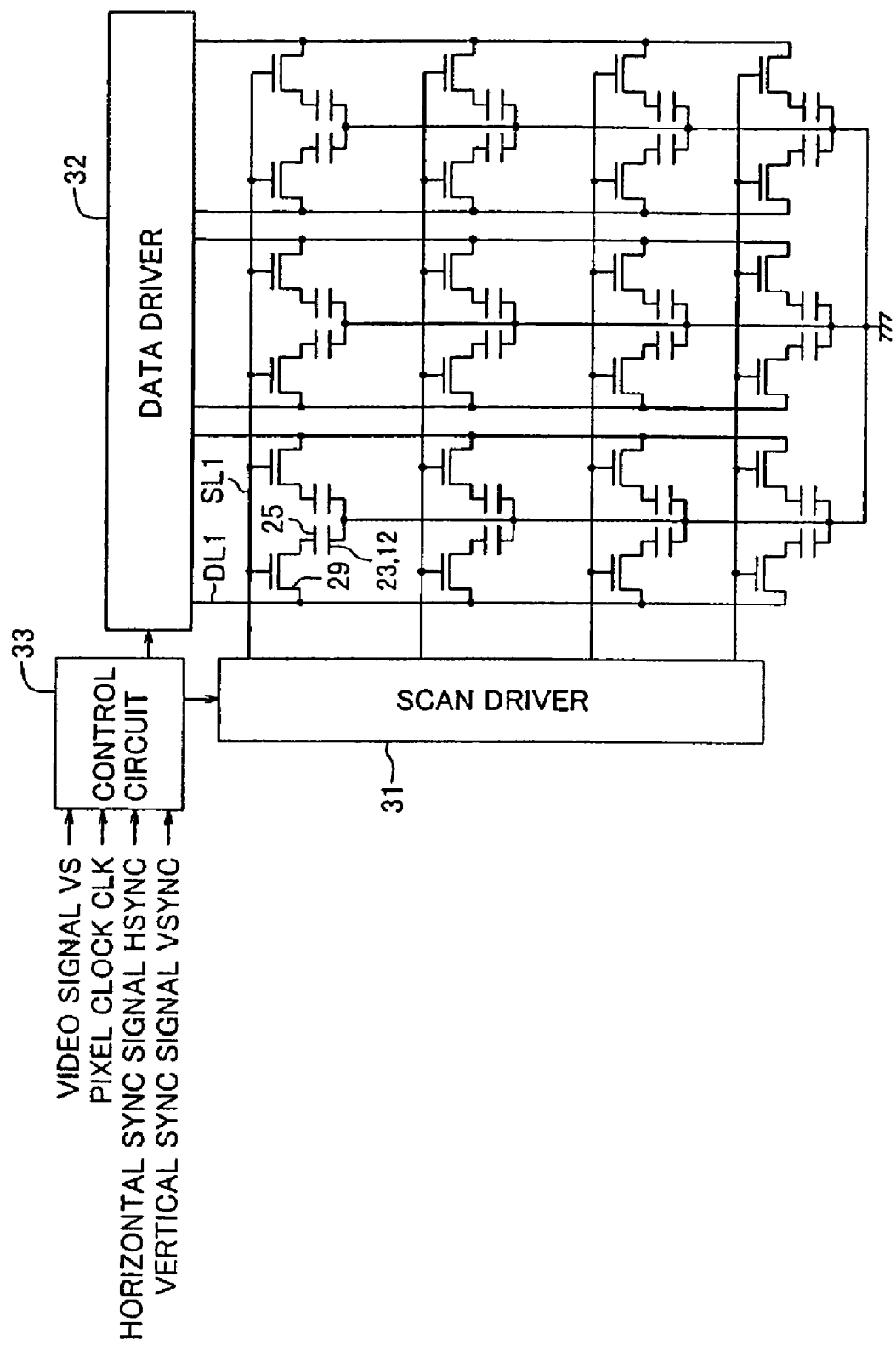
FIG. 1 is a schematic circuit diagram of a liquid crystal display device for use in a method of the present invention.

Referring now to the drawings, wherein like reference characters designate like or corresponding parts throughout several views, preferred embodiments of the present invention are described below.

First embodiment

First of all, there will be described a development method capable of decreasing the development term of the LCD panel which has a structure or employs material capable of reducing a persistence degree.

FIG. 1 is a schematic circuit diagram of a liquid crystal display device for use in a method according to the present invention. FIG. 1 shows a case where a pixel array has a matrix with 3 rows and 6 columns for simplicity.

Figure 31:
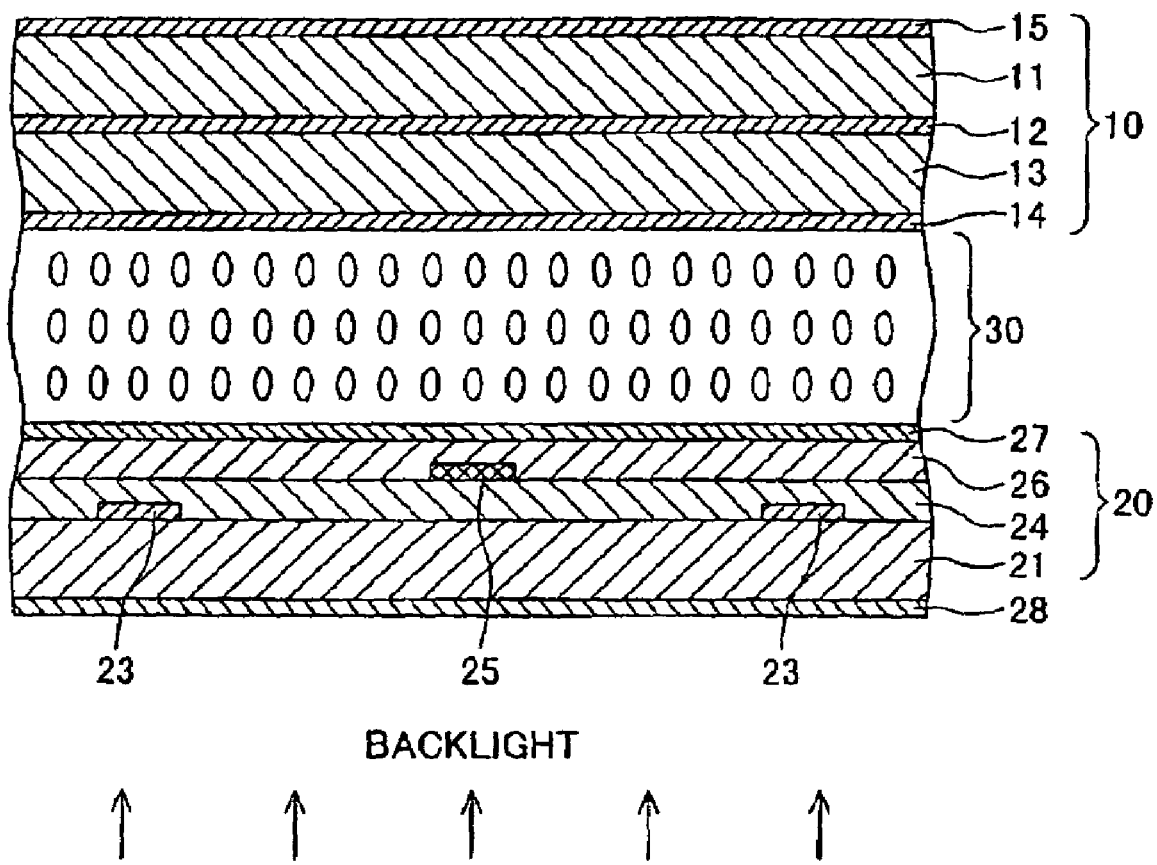
FIG. 31 is a schematic sectional view showing a structure of one pixel of an LCD panel compared to the present invention in a state where no voltage is applied.

The circuit itself is the same as that of the prior art. A data line DL1, a scan line SL1, TFT 29, a pixel electrode 25, a common electrode 23, and a flat electrode 12 in FIG. 1 are formed as shown in FIG. 31 for example. The flat electrode 12 is provided for all the pixel electrodes. The scan lines are connected to the output of a scan driver 31, and the data lines are connected to the output of a data driver 32. A control circuit 33 controls the data driver 32 on the basis of a pixel clock CLK and a horizontal sync signal HSYNC, and also provides a video signal VS to the data driver 32, and further controls the scan driver 31 on the basis of the horizontal sync signal HSYNC and a vertical sync signal VSYNC. Rows of a pixel array are line-sequentially selected by the scan driver 31, and display data (a gradation voltage set) is provided to the pixels of a selected row from the data driver 32.

Figure 2:
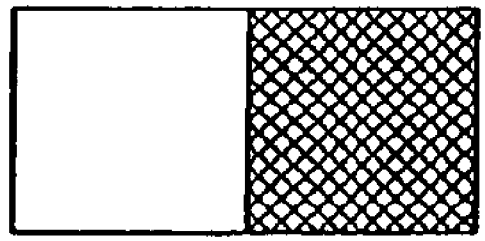
FIG. 2 is an illustration of a persistence degree.
Figure 2:
Figure 2:
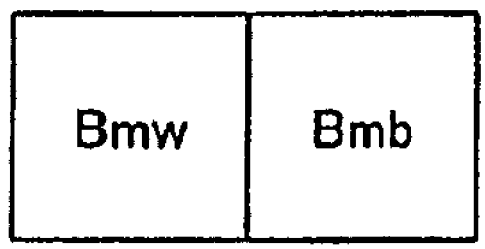

FIG. 2 is an illustration of a persistence degree.

For example, a case is considered where display data of each pixel has a 64-step gradation, white corresponds to the sixty-fourth gradation and black corresponds to the first gradation. The persistence degree is defined as follows:

(A) A fixed pattern including white and black is displayed, for example, for 48 hours.

(B) Immediately thereafter, the halftone of the thirty-second gradation is displayed, and the brightness Bmw and Bmb in respective regions in which the white and black was displayed in the step (A) are measured. The persistence degree PD is calculated with the following formula:

$$PD = 100(Bmw - Bmb)/Bm \%$$

where Bm is a smaller one of the Bmw and Bmb.

In the step (B), in order that no persistence can be recognized by a human, a persistence degree has to be less than 6% under ordinary illumination in a room and less than 3% in dark room.

The persistence degree is different according to a structure or material of an LCD panel. In development of an LCD panel, if the persistence degree is measured at each trial when a structure or material of an LCD panel is changed in order to reduce the persistence degree to a value lower than a given value, and it takes, for example, 48 hours to measure the persistence degree in each trial, which makes a development term thereof longer. Therefore, it is effective to search a physical quantity having a high correlation with the persistence degree and which can be measured in a short time.

Figure 3:
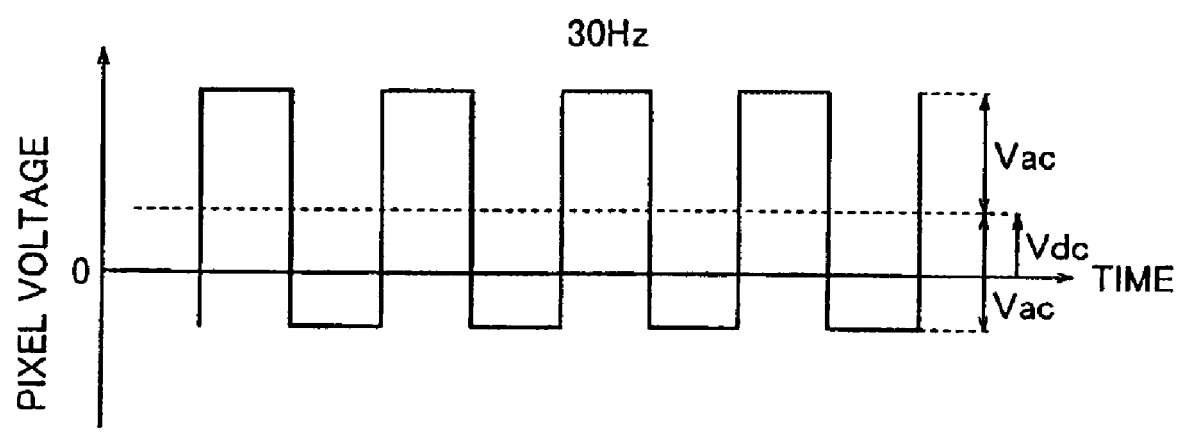
FIG. 3 is a graph showing a voltage waveform, having an AC amplitude Vac and a DC component Vdc, applied on a liquid crystal pixel.

Liquid crystal pixel is applied with an AC voltage of rectangular wave in order to prevent its degradation. FIG. 3 shows a voltage waveform applied between the pixel electrode 25 and the common electrode 23, and between the pixel electrode 25 and the flat electrode 12 of FIG. 32, wherein a frequency is 30 Hz.

The voltage waveform has a DC component in order to prevent flickers from arising under the application of the only AC voltage, that is, in order to avoid a cyclical change in transmittance. The amplitude of the AC voltage of rectangular wave and the DC voltage component are indicated by Vac and Vdc, respectively.

Figure 4:
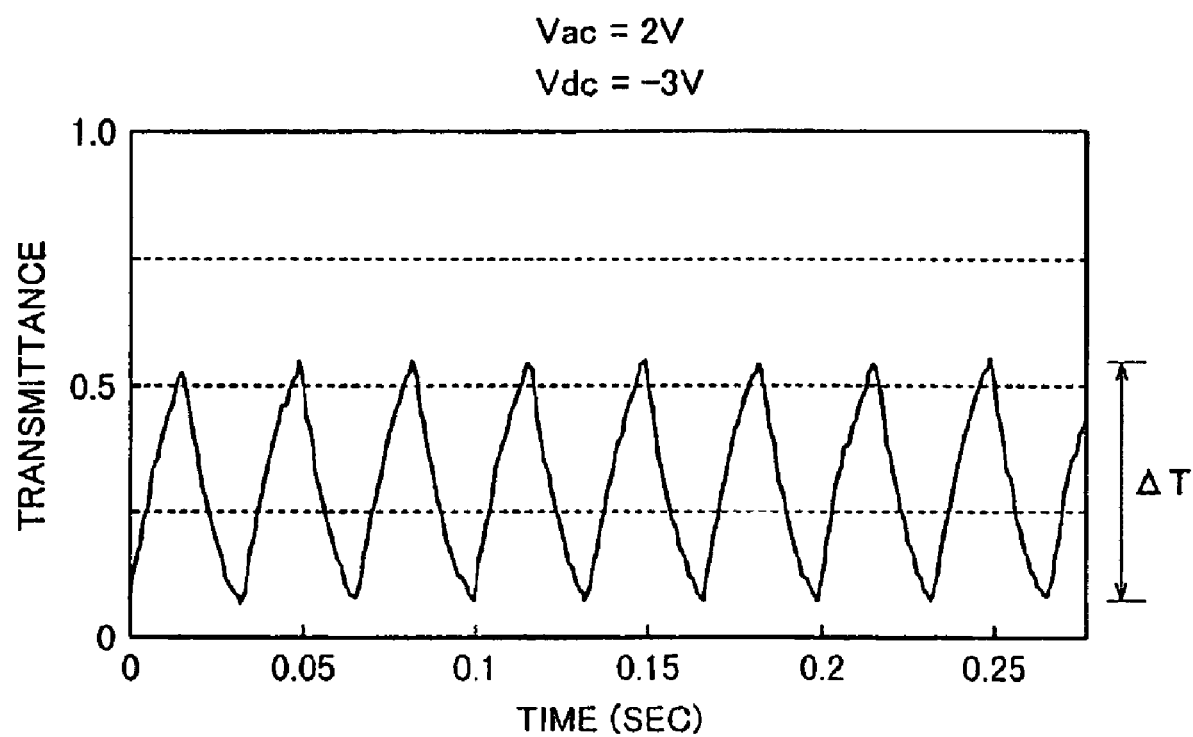
FIG. 4 are graphs showing a measured transmittance waveform of the liquid crystal pixel in a case where the AC amplitude Vac is 2 V and the DC component Vdc is −3 V.
Figure 5:
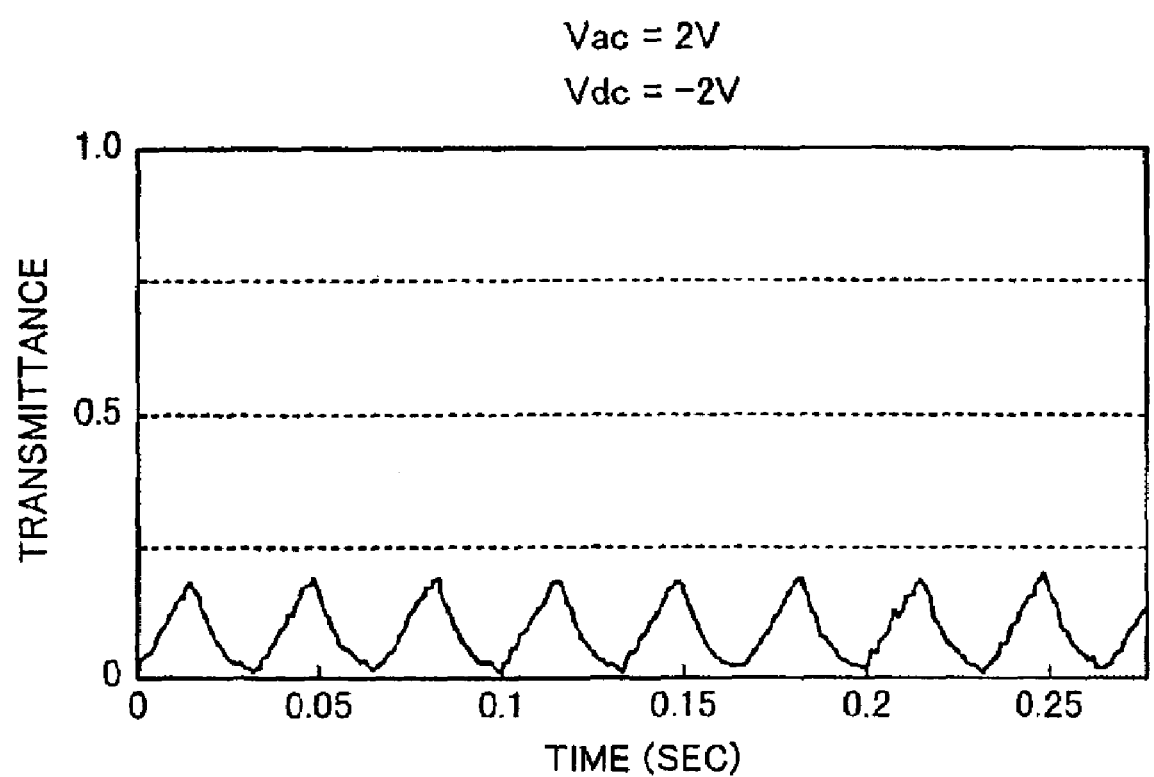
FIG. 5 is a graph showing a measured transmittance waveform of the liquid crystal pixel in a case where the AC amplitude Vac is 2 V and the DC component Vdc is −2V.
Figure 6:
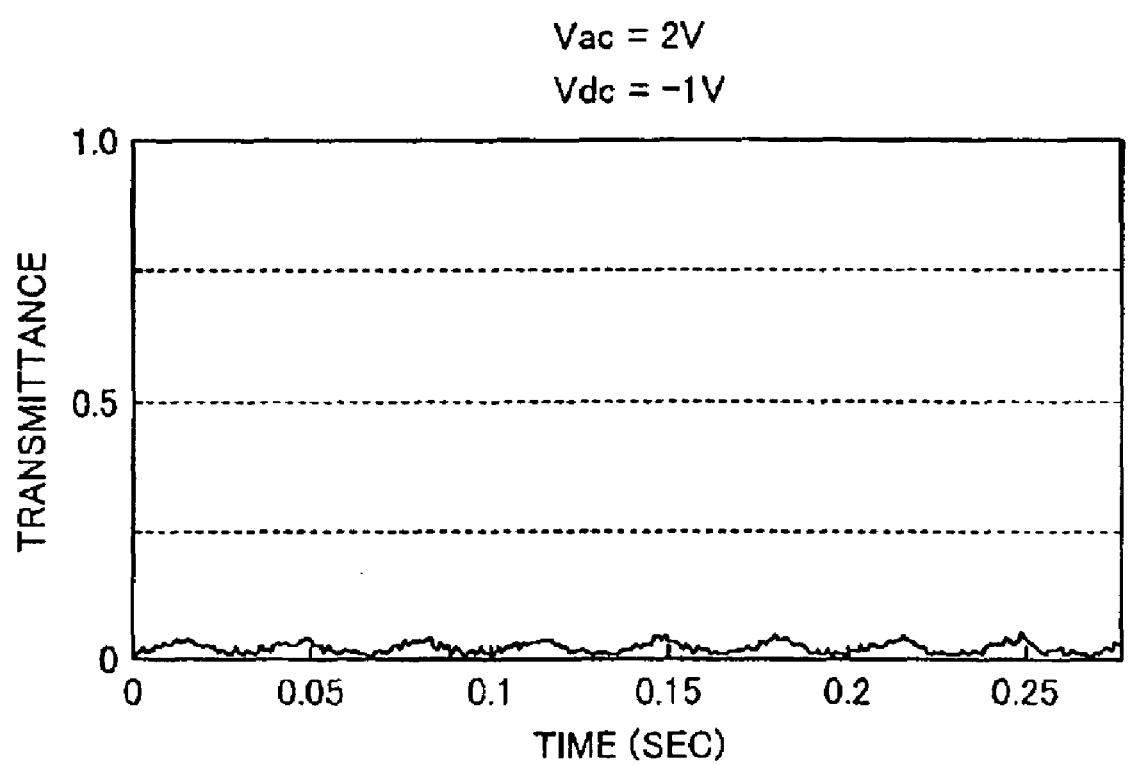
FIG. 6 is a graph showing a measured transmittance waveform of the liquid crystal pixel in a case where the AC amplitude Vac is 2 V and the DC component Vdc is −1V.
Figure 7:
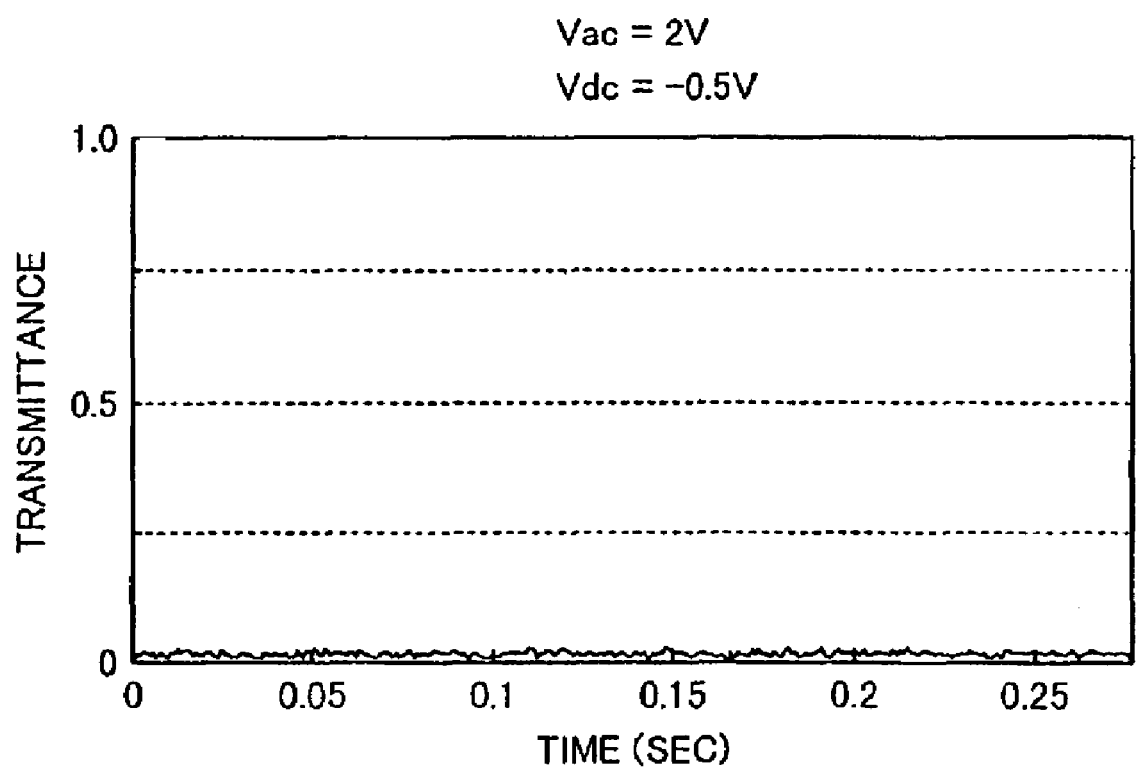
FIG. 7 is a graph showing a measured transmittance waveform of the liquid crystal pixel in a case where the AC amplitude Vac is 2 V and the DC component Vdc is −0.5 V.
Figure 8:
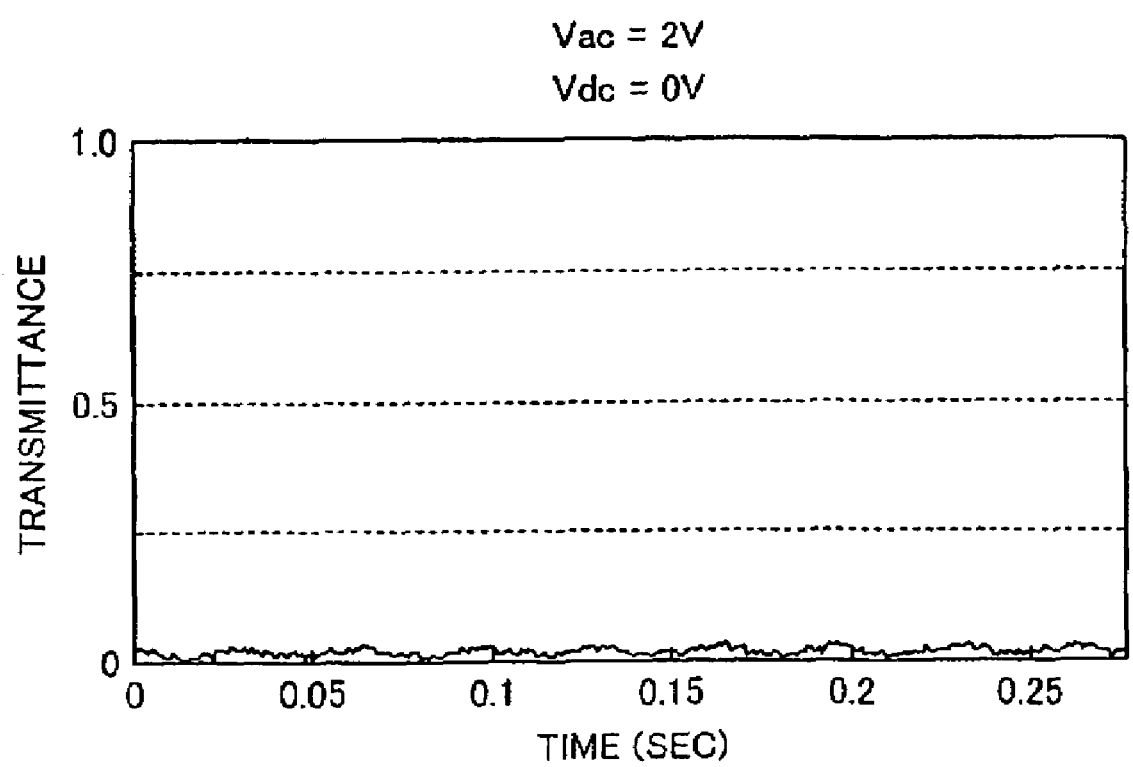
FIG. 8 is a graph showing a measured transmittance waveform of the liquid crystal pixel in a case where the AC amplitude Vac is 2 V and the DC component Vdc is 0 V.
Figure 9:
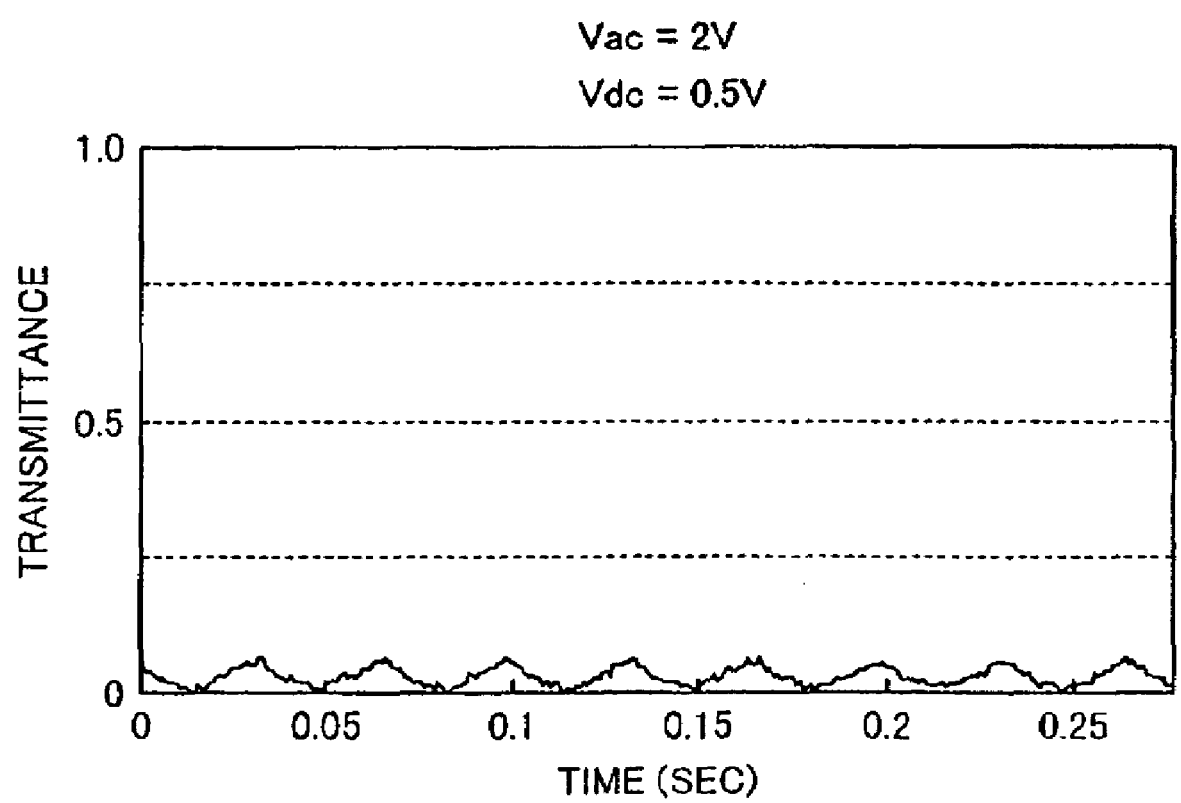
FIG. 9 is a graph showing a measured transmittance waveform of the liquid crystal pixel in a case where the AC amplitude Vac is 2 V and the DC component Vdc is 0.5 V.
Figure 10:
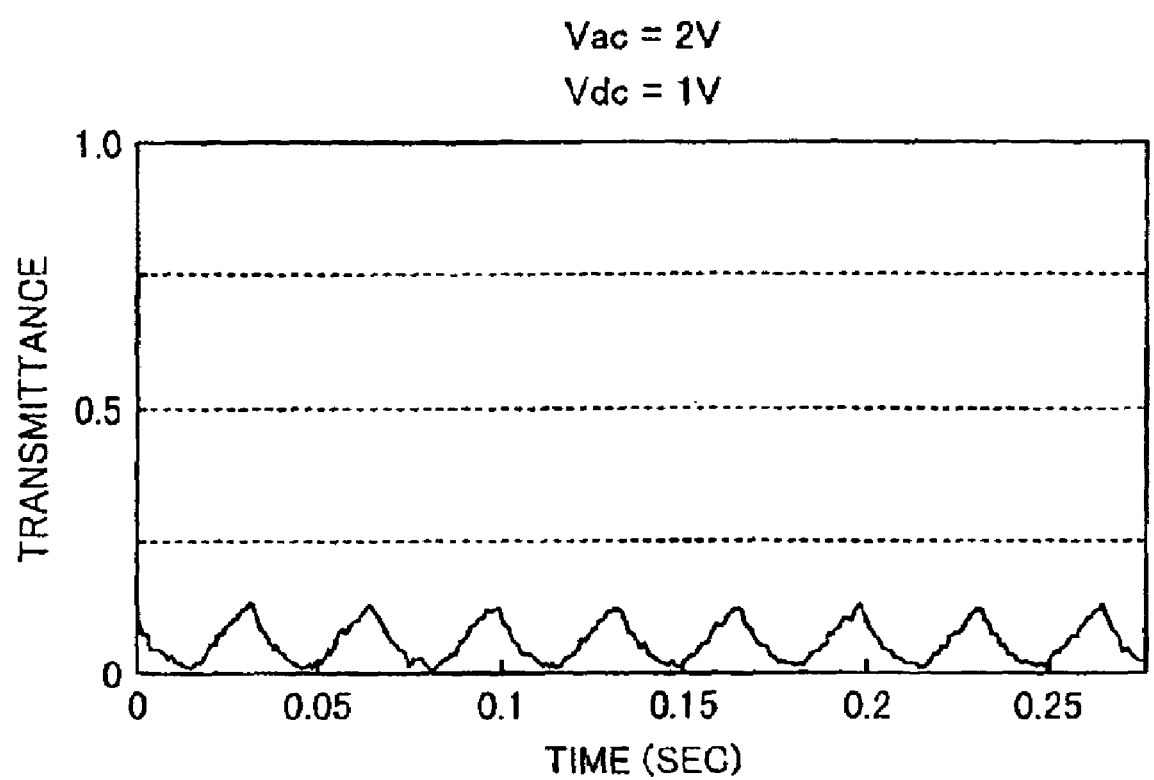
FIG. 10 is a graph showing a measured transmittance waveform of the liquid crystal pixel in a case where the AC amplitude Vac is 2 V and the DC component Vdc is 1 V.
Figure 11:
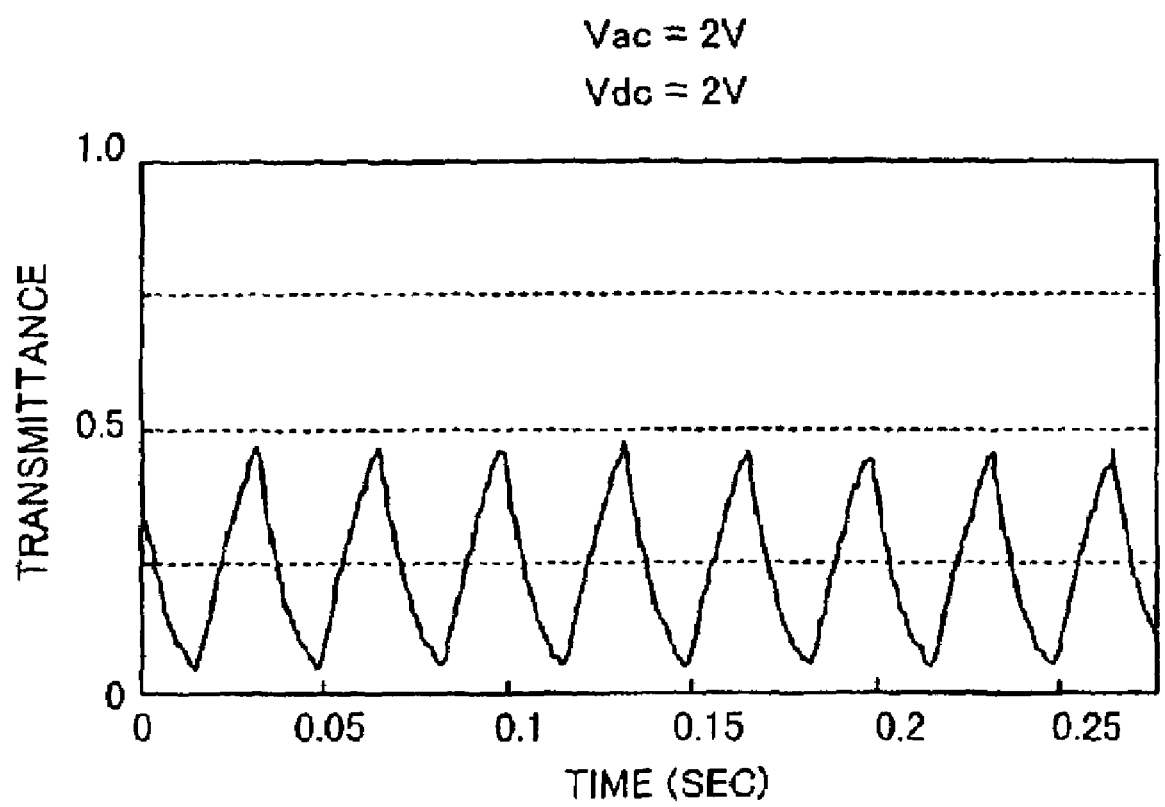
FIG. 11 is a graph showing a measured transmittance waveform of the liquid crystal pixel in a case where the AC amplitude Vac is 2 V and the DC component Vdc is 2 V.
Figure 12:
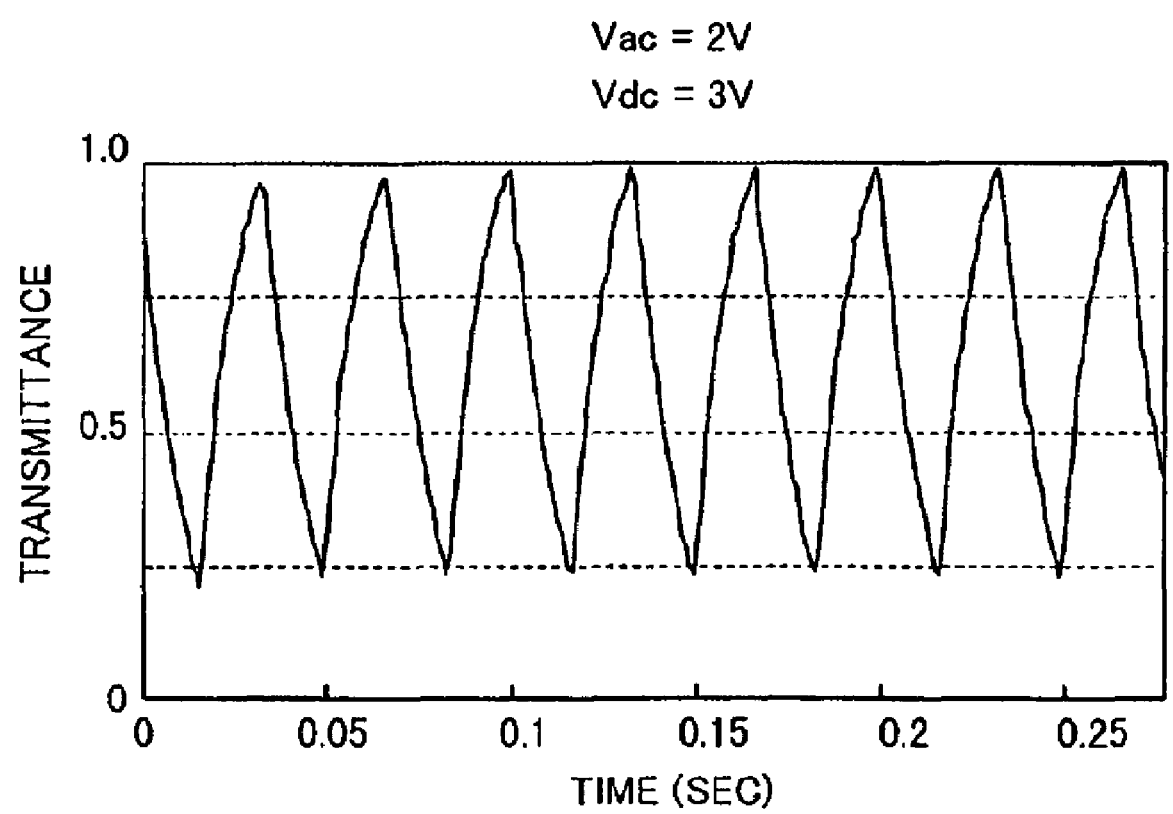
FIG. 12 is a graph showing a measured transmittance waveform of the liquid crystal pixel in a case where the AC amplitude Vac is 2 V and the DC component Vdc is 3 V.

The LCD panel transmittance was measured each time the DC component Vdc was altered stepwise with the AC amplitude being fixed. FIGS. 4 to 12 show variations in transmittance in cases where the DC component Vdc was set at −3 V, −2 V, −1 V. −0.5 V, 0 V, 0.5 V, 1 V, 2 V and 3 V, respectively, with the AC amplitude Vac being fixed at a black display voltage 2V. As shown in FIG. 4, the range of transmittance variation is indicated by ΔT.

Figure 13:
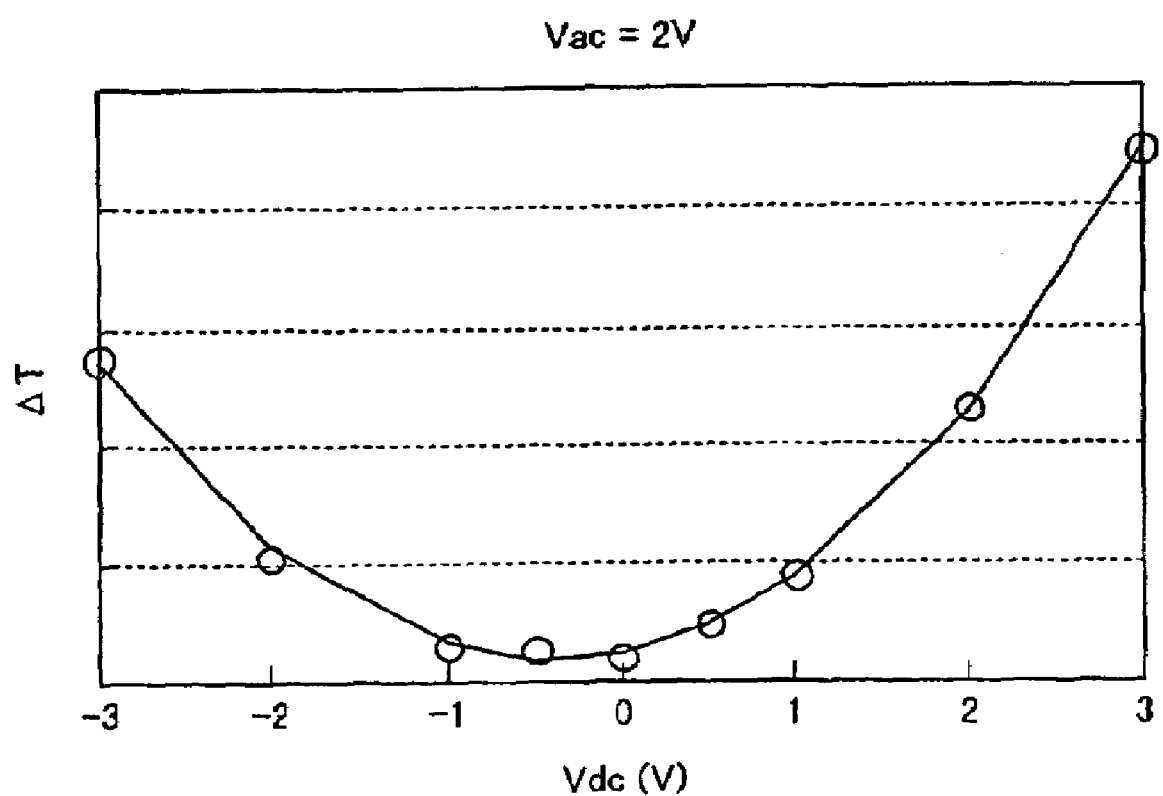
FIG. 13 is a graph showing a measured relationship between the DC component Vdc and the variation width ΔT of liquid crystal pixel transmittance in a case where the AC amplitude Vac is 2 V.

FIG. 13 is a graph showing a relationship between the DC component Vdc and the range of transmittance variation ΔT in a case where the AC amplitude Vac is 2 V. It is estimated from this graph that the value of the DC component Vdc at which the range of transmittance variation ΔT is the minimum is −0.38 V.

Figure 14:
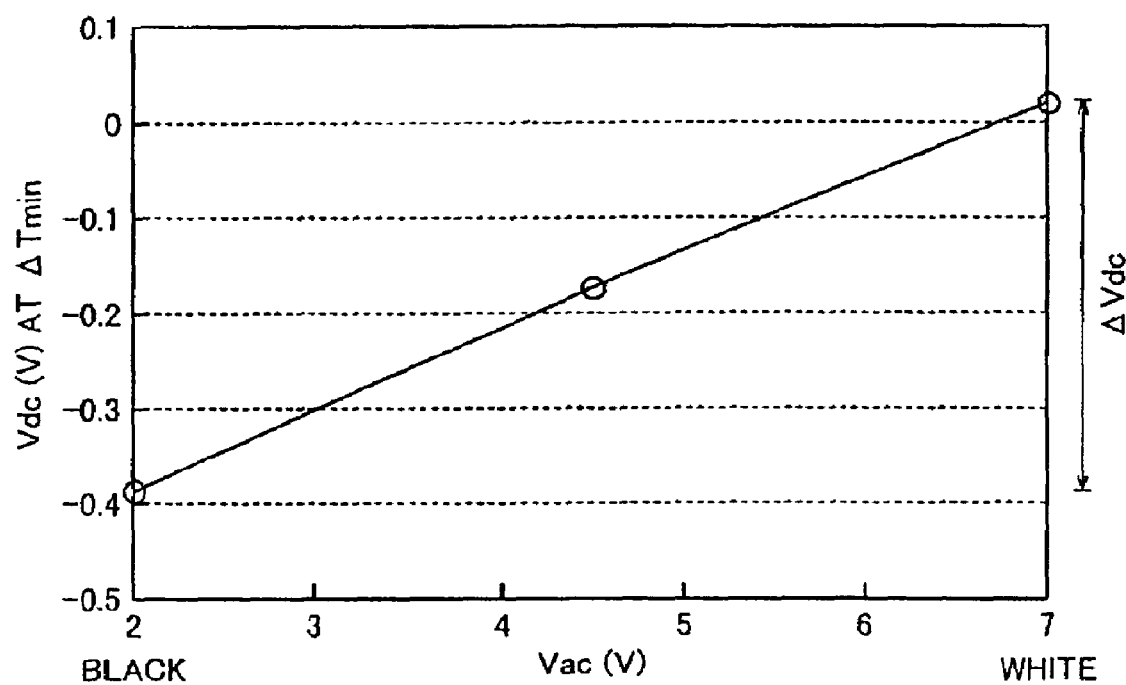
FIG. 14 is a graph showing a measured relationship between the AC amplitude Vac, and the value of DC component Vdc at which the variation width ΔT of liquid crystal pixel transmittance is the minimum.

Likewise, measured are the value of the DC component Vdc at which the range of transmittance variation ΔT assumes the minimum ΔTmn in cases where the AC amplitude Vac is a white display voltage 7 V and a halftone display voltage (2+7)/2=4.5 V. FIG. 14 shows the results obtained by the measurement, wherein ΔVdc denotes the range of optimal DC component variation. The DC component Vdc is fixed in an actual liquid crystal display device. Therefore, as the range of optimal DC component variation ΔVdc decreases, flickers become weaker.

Figure 15:
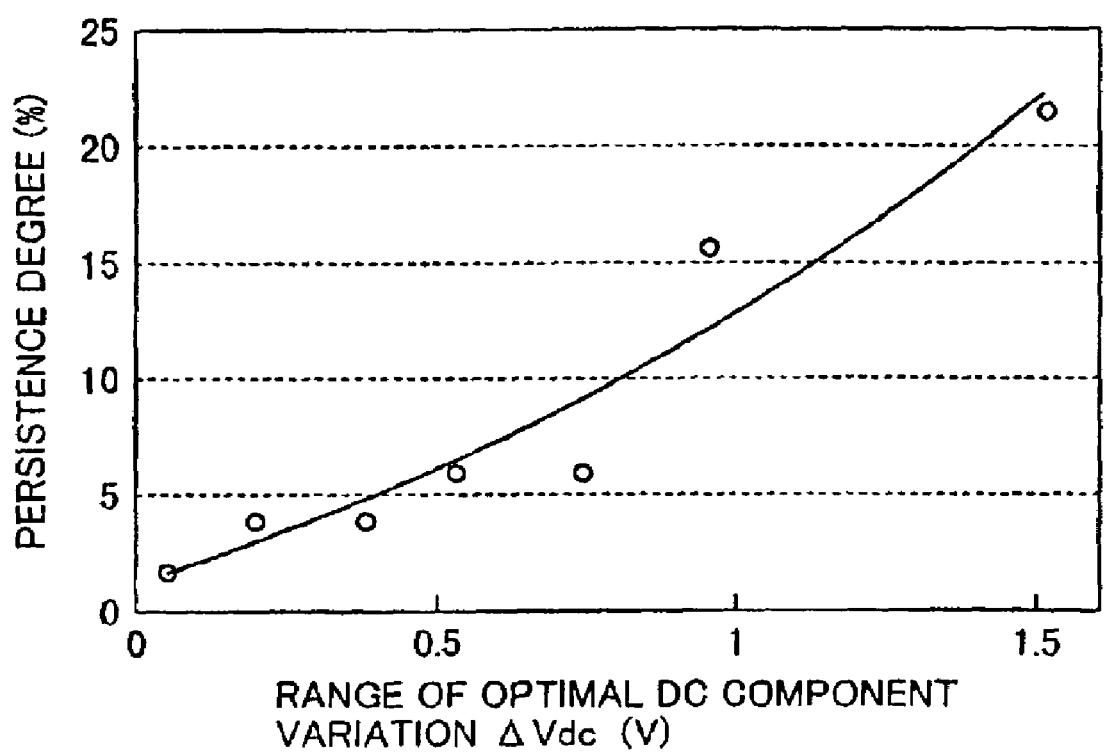
FIG. 15 is a graph showing a measured relationship between a persistence degree and the range of optimal DC component variation ΔVdc.

FIG. 15 is a graph showing a relationship between the persistence degree and the range of optimal DC component variation ΔVdc, obtained by measuring the persistence degree and the range of optimal DC component variation ΔVdc each time the structure or material of an LCD panel is changed. It can be seen that there is a very high correlation between the persistence degree and the range of optimal DC component variation ΔVdc. Further, it is found that in order to lower the persistence degree less than the above described 6%, the range of optimal DC component variation ΔVdc has to be less than 0.5 V, and in order to lower the persistence degree less than the above described 3%, the range of optimal DC component variation ΔVdc has to be less than 0.2 V.

Since the range of optimal DC component variation ΔVdc can be measured in a short time with ease, by use of ΔVdc it is possible to reduce the development term of an LCD panel with the persistence degree being less than a given value.

Note that it was confirmed that there is a high correlation between the range of optimal DC component variation ΔVdc and the persistence degree even in LCD panels having structures where the pixel electrode 25 and the common electrodes 23 are employed without the flat electrode 12 and the pixel electrode 25 and the flat electrode 12 are employed without the common electrodes 23, and therefore there will be a similar correlation therebetween in LCD panels having other structures.

Second Embodiment

Figure 16:
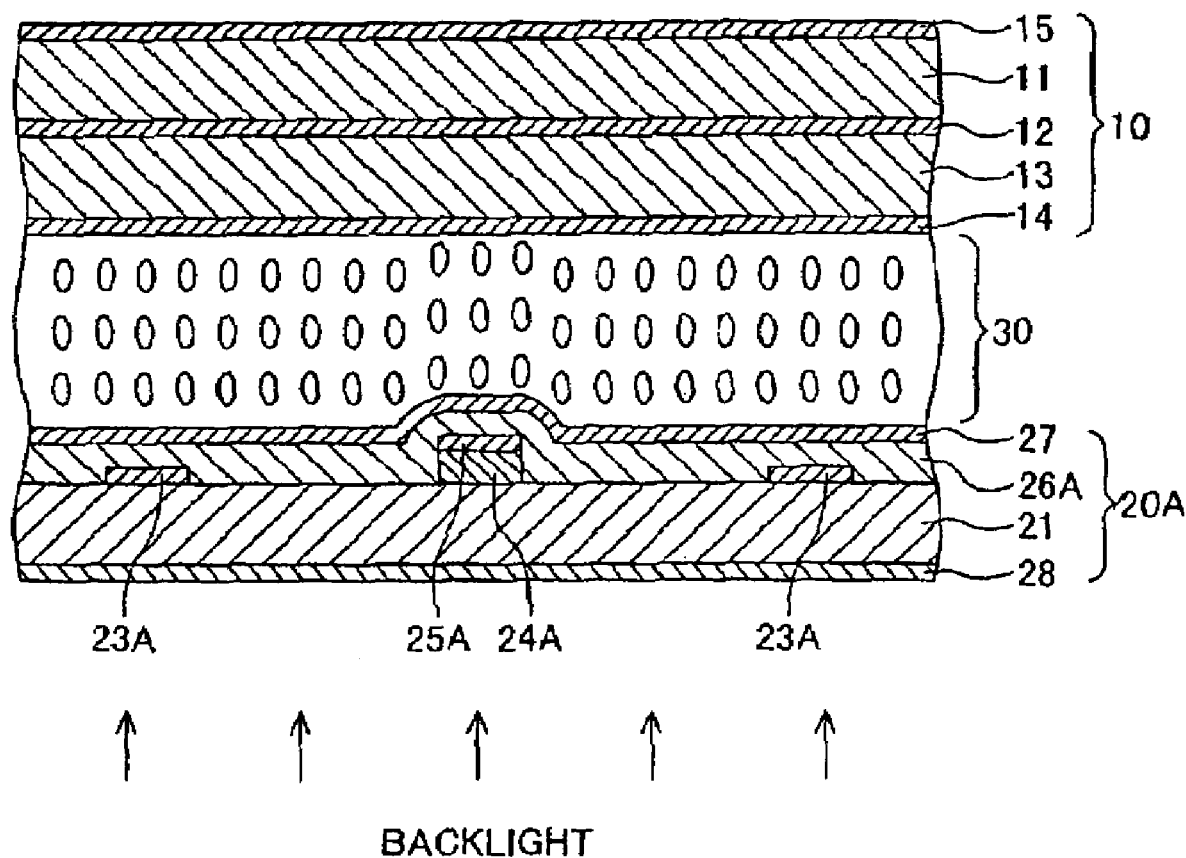
FIG. 16 is a schematic sectional view showing a structure of a liquid crystal pixel capable of reducing a persistence degree in a state where no voltage is applied, of a second embodiment according to the present invention.
Figure 17:
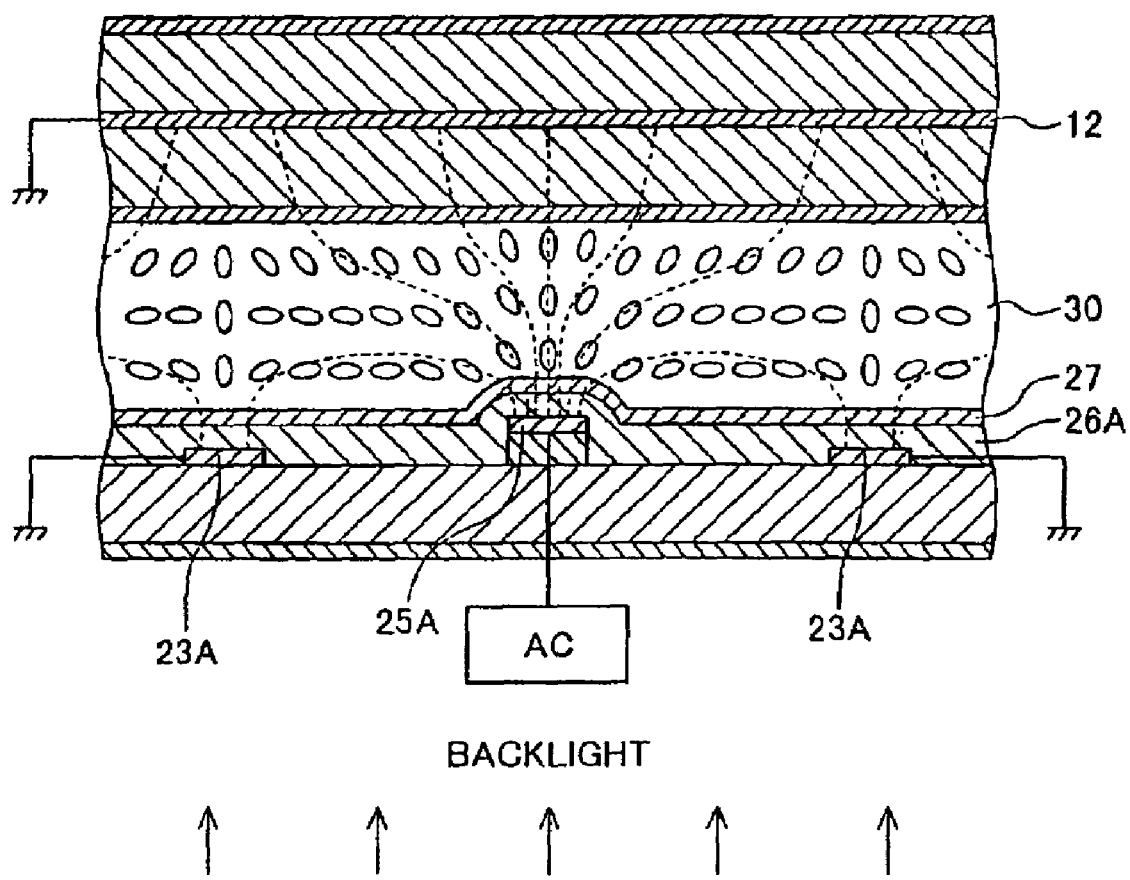
FIG. 17 is a schematic sectional view showing the liquid crystal pixel of FIG. 16 in a state where a voltage is applied.
Figure 18A:
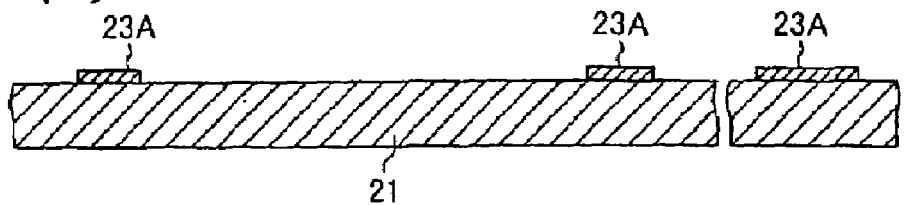
FIGS. 18(A)-18(F) are schematic sectional views showing a fabrication process of the substrate 20A of FIG. 16.
Figure 18B:
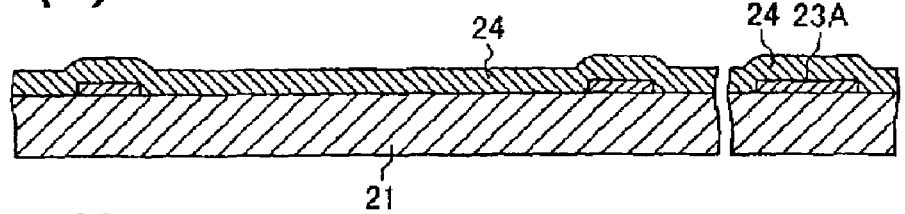
Figure 18C:
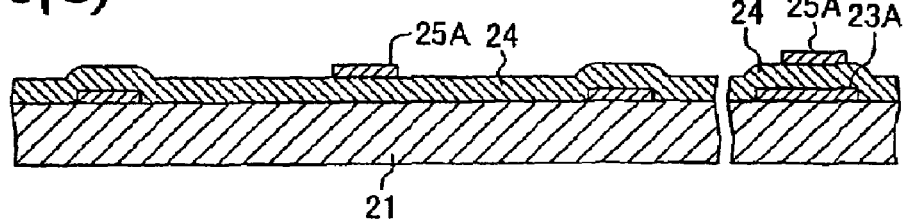
Figure 18D:
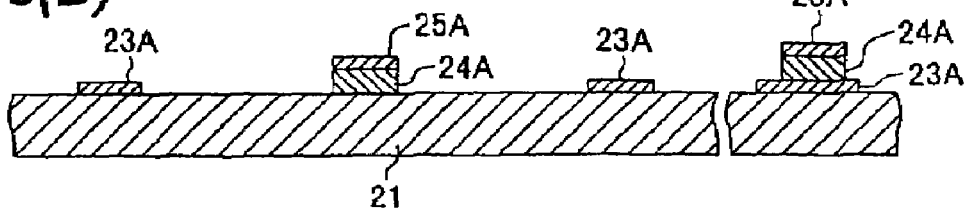
Figure 18E:
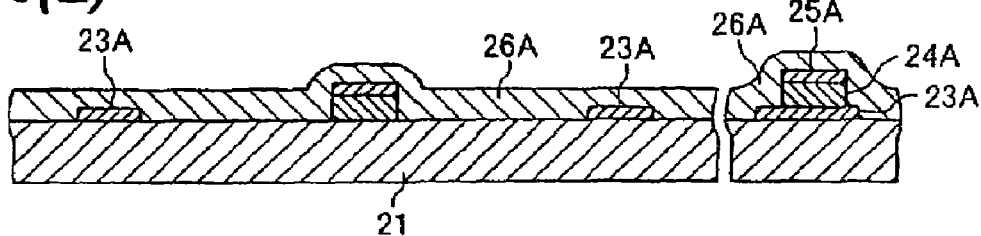
Figure 18F:
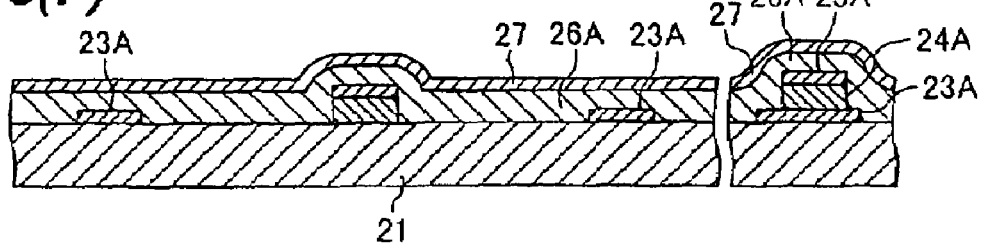

FIGS. 16 and 17 are schematic sectional views showing a structure of a liquid crystal pixel capable of reducing the persistence degree, of a second embodiment according to the present invention, wherein FIG. 16 shows a state where no voltage is applied and FIG. 17 shows a state where a voltage is applied.

The structure of a substrate 20A is different from that of the substrate 20 of FIG. 31. The other structure is the same as that of FIG. 31.

FIG. 18 are schematic sectional views showing a fabrication process of the substrate 20A. In FIG. 18, the right end portions of (A) to (F) indicate a place where a common electrode 23A and a pixel electrode 25A are stacked with an insulating layer 24A interposing therebetween.

(A) A common electrode 23A made of metal is formed on a transparent insulating substrate 21 by photolithography.

(B) an insulating layer 24 is coated on the substrate 21.

(C) A pixel electrode 25A is formed on the insulating layer 24 by photolithography.

(D) The insulating layer 24 is etched with the pixel electrode 25A as a mask and the only portion thereof under the pixel electrode 25A is left.

(E) An insulating layer 26A is coated on the substrate 21.

(F) A vertically oriented layer 27 is coated on the insulating layer 26A.

By fabricating the substrate 20A in such a way, as shown in FIG. 16, the thicknesses of the insulating layer 26A over the pixel electrode 25A is substantially equal to that over the common electrode 23A. Therefore, electric states over and near the common electrode 23A and over and near the pixel electrode 25A are almost the same as shown in FIG. 17 in a case where an AC voltage of rectangular wave is applied between the pixel electrode 25A and the common electrode 23A, and the persistence is reduced in comparison with an LCD panel having the structure of FIG. 31. In other words, the range of optimal DC component variation ΔVdc of FIG. 15 decreases, and thereby the persistence degree becomes lower.

The insulating layers 24A and 26A are made of, for example, SiNx, SiO2, resist or acrylic resin. In a trial, SiNx was used as the insulating layers 24A and 26A, JALS 204 made by JSR Co. as the vertically oriented layer 27, and ZLI4535 made by Merck Japan Co. as the liquid crystal 30, and the persistence degree reducing effect of the trial article was confirmed.

Third Embodiment

Figure 19:
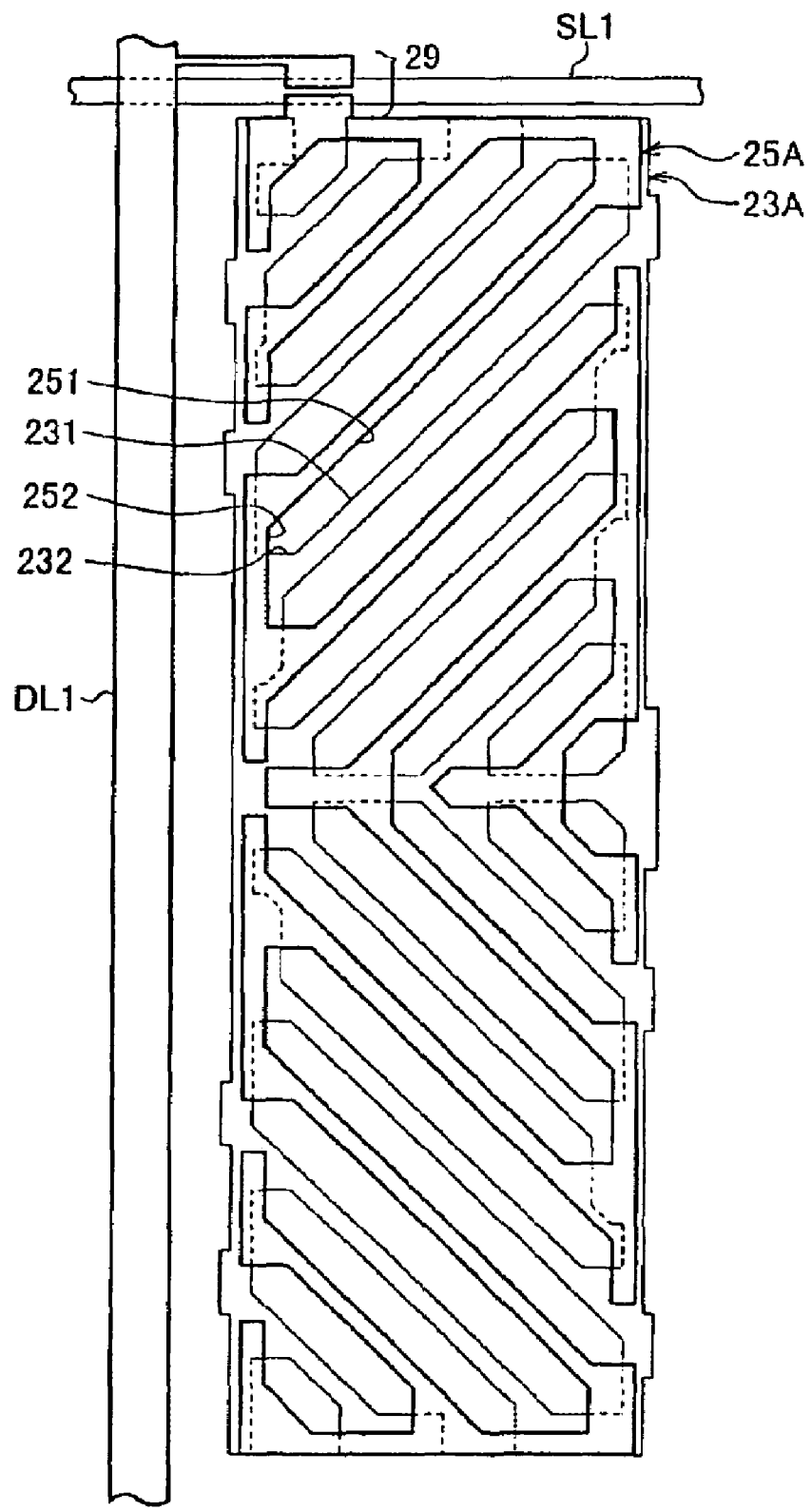
FIG. 19 is a plane view showing an electrode pattern of a liquid crystal pixel capable of reducing a persistence degree, of a third embodiment according to the present invention.
Figure 33:
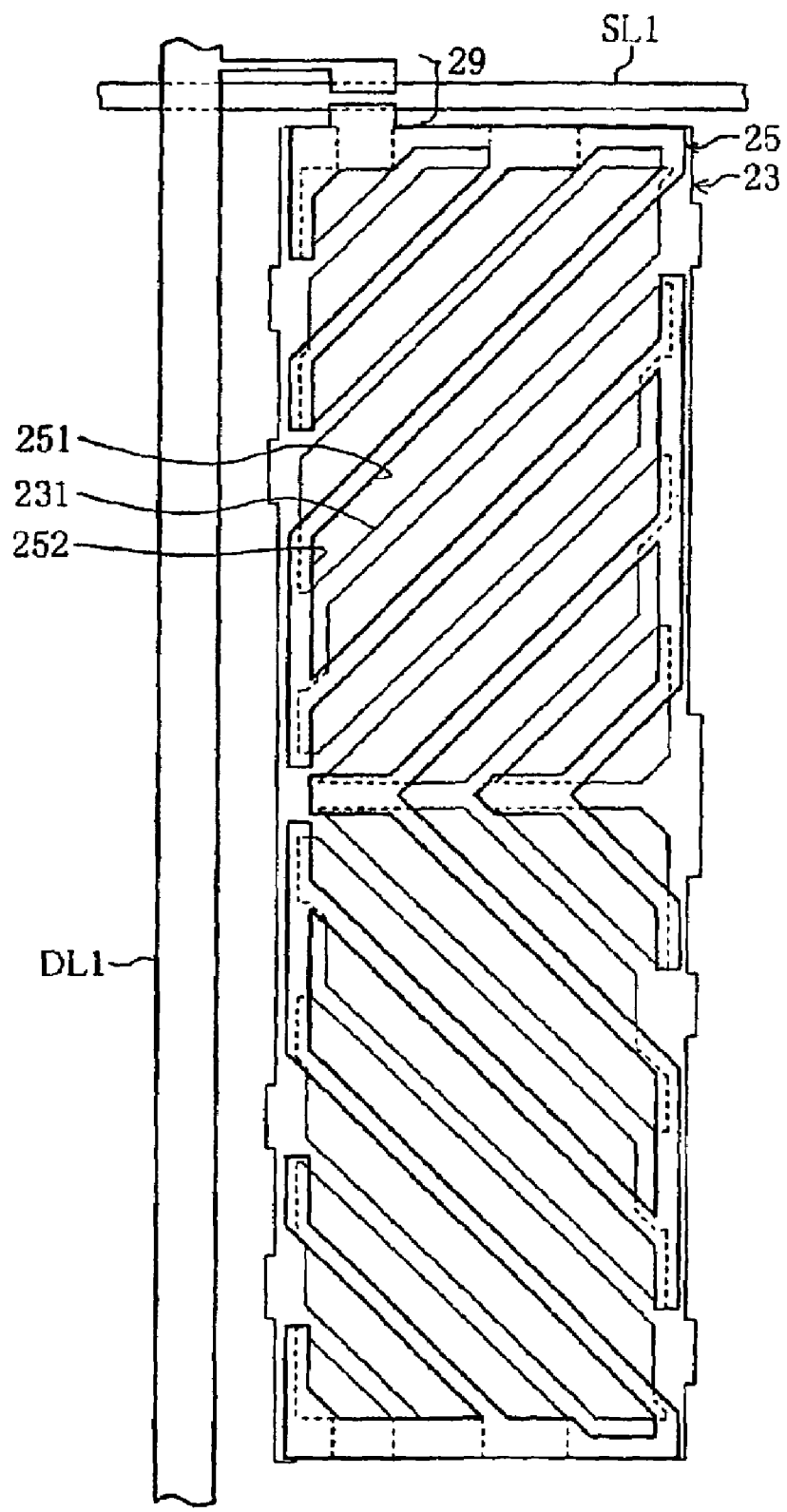
FIG. 33 is a plane view showing an electrode pattern of one pixel formed in the substrate 20 of FIG. 31.

FIG. 19 is a plane view showing an electrode pattern of a liquid crystal pixel capable of reducing the persistence degree, of a third embodiment according to the present invention, which is analogous to FIG. 33.

The electrode pattern is formed, for example, in the substrate 20A of FIG. 16 or the substrate 20 of FIG. 31.

Figure 20:
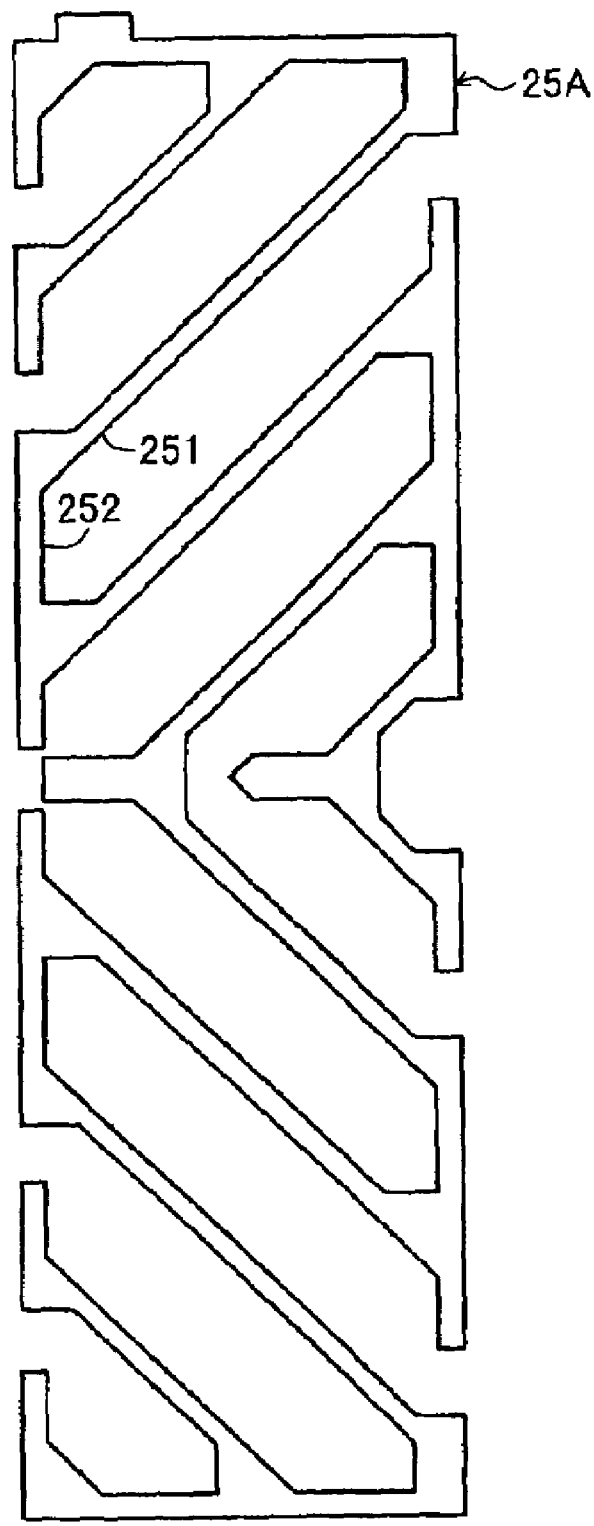
FIG. 20 is a plane view showing the pixel electrode of FIG. 19.
Figure 21:
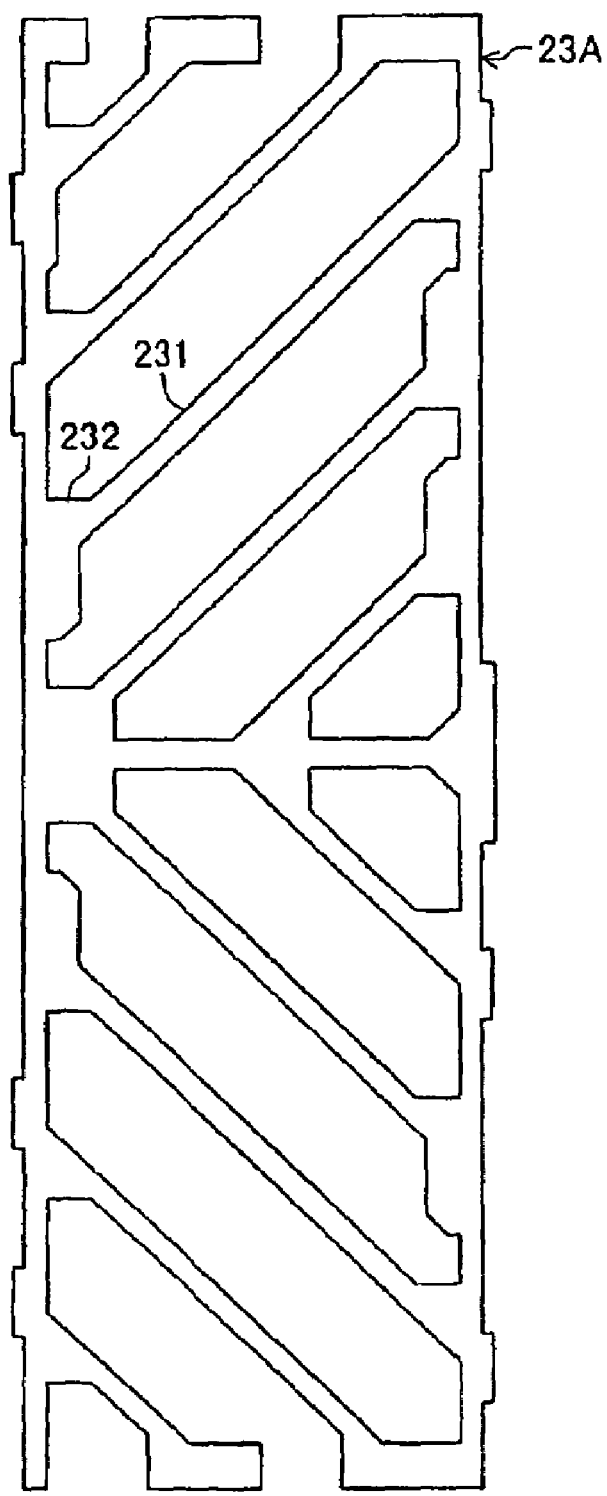
FIG. 21 is a plane view showing the common electrode of FIG. 19.
Figure 34:
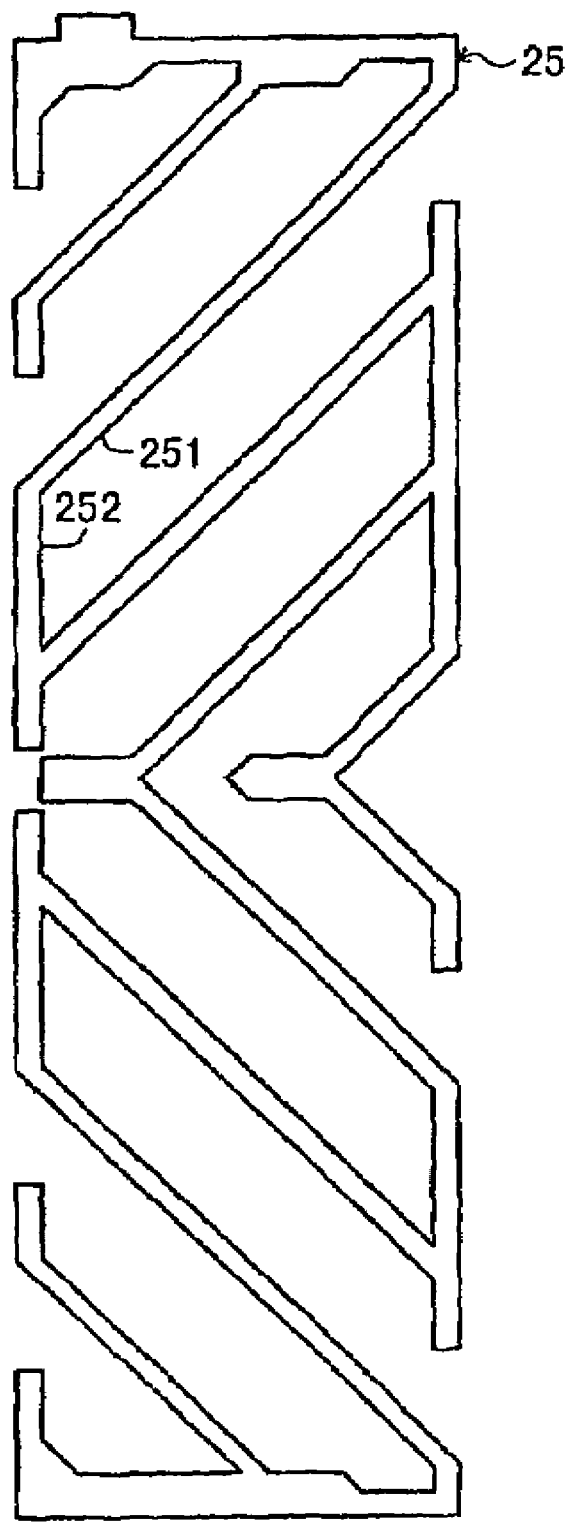
FIG. 34 is a plane view showing the pixel electrode of FIG. 33.
Figure 35:
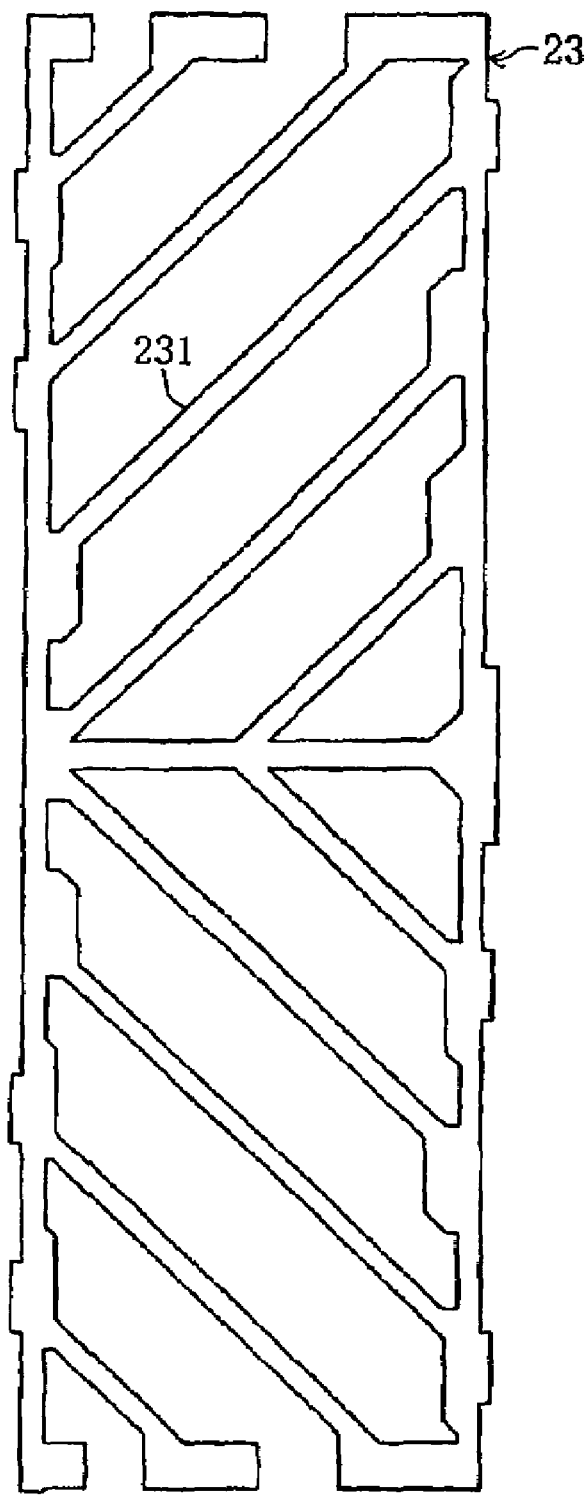
FIG. 35 is a plane view showing the common electrode of FIG. 33.

FIGS. 20 and 21 are plane views showing the pixel electrode 25A and the common electrode 23A of FIG. 19, which are analogous to FIGS. 34 and 35, respectively.

A peripheral section of the pixel or common electrode has crossover portions to stripe electrodes of the common or pixel electrodes with the insulating layer interposing therebetween since a pixel has a rectangular shape, and each of the pixel electrode 25A and the common electrode 23A has stripe electrodes in parallel to each other and has a continuous shape. For example, a side 251 of the pixel electrode 25A is connected to a side 252 of the peripheral section, and a side 231 of the common electrode 23A is parallel to the side 251, while the sides 252 and 232 are connected to the side 251 and 231, respectively, crosses over each other.

Figure 22A:
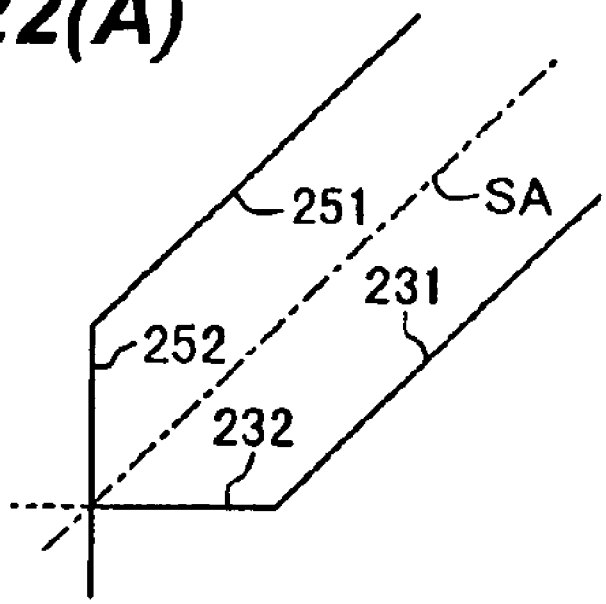
FIG. 22(A) is an enlarged partial view near a crossover of a stripe electrode and the peripheral section of FIG. 19.
Figure 22B:
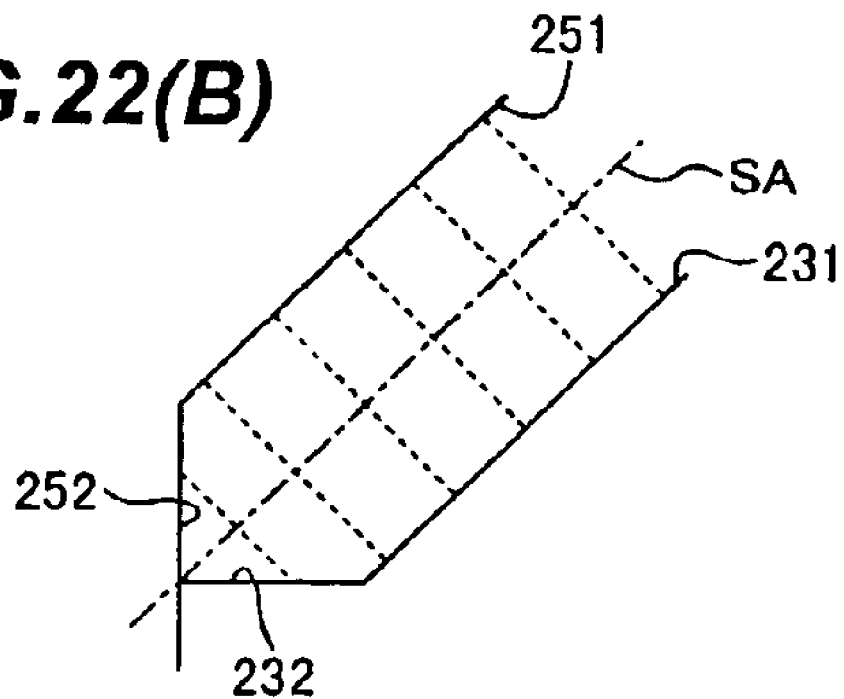
FIG. 22(B) is a diagram showing the lines of electric force with dotted lines near the crossover when a voltage is applied between the electrodes of FIG. 22(A).

FIG. 22(A) is a partial enlarged view near a crossover of electrodes. FIG. 22(B) shows the lines of electric force with dotted lines when a voltage is applied between the pixel electrode 25A and the common electrode 23A.

Figure 36A:
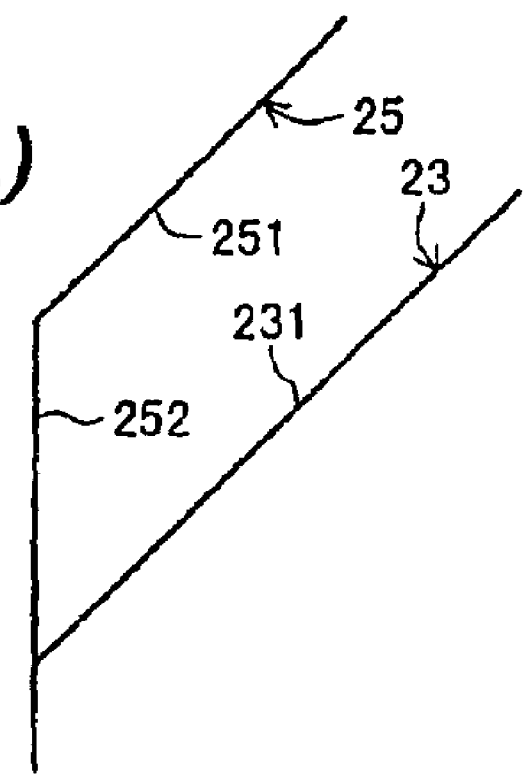
FIG. 36(A) is an enlarged partial view of the pattern near a crossover between electrodes of FIG. 33.
Figure 36B:
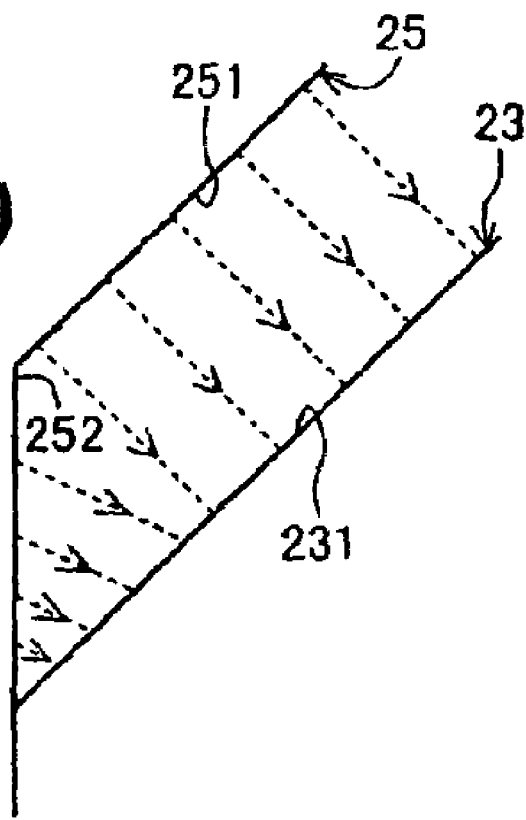
FIG. 36(B) is a diagram showing the lines of electric force with dotted lines when a voltage is applied between the electrodes of FIG. 36(A).
Figure 37:
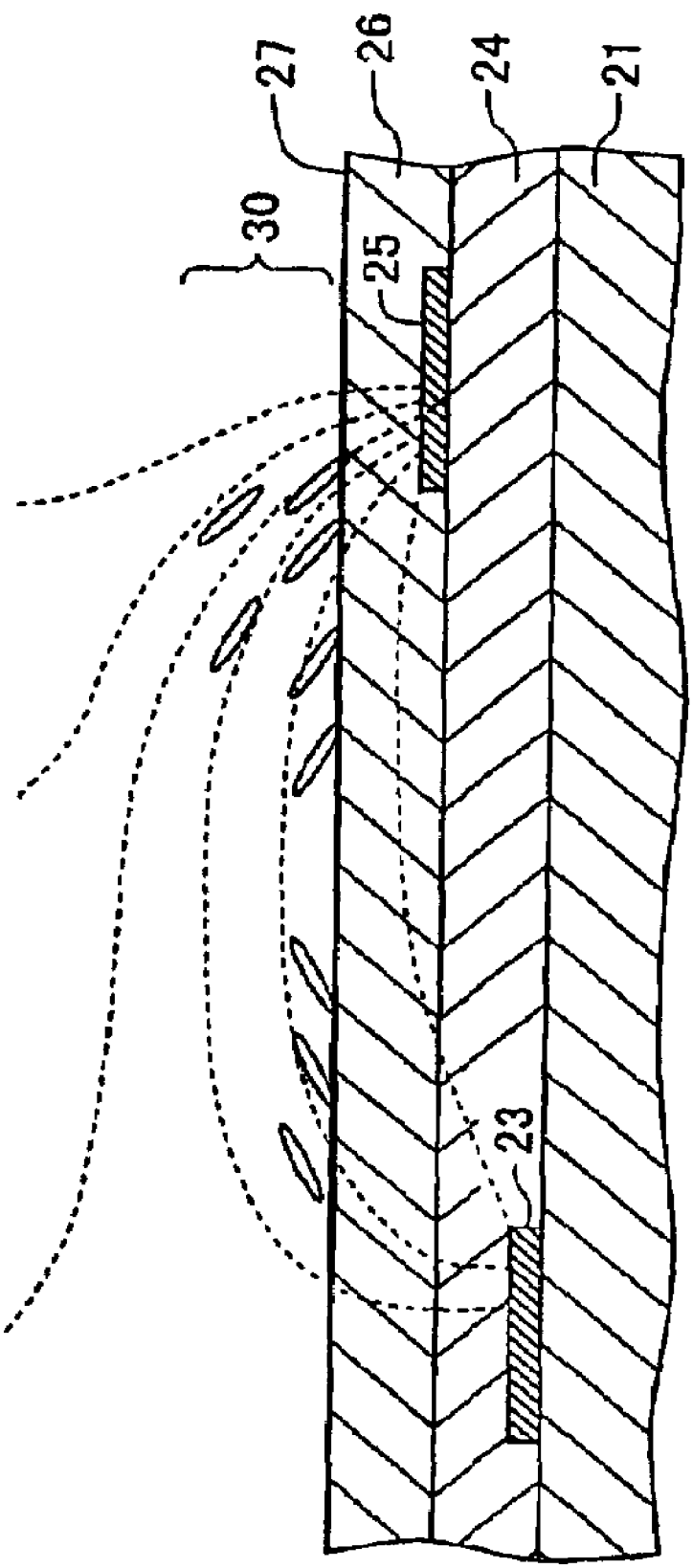
FIG. 37 is a schematic sectional view showing inclination of liquid crystal molecules between a pixel electrode and a common electrode of one pixel of a prior art LCD panel when a voltage is applied therebetween.

Since the sides 252 and 232 cross over each other at an obtuse angle, concentration of the lines of electric force decreases, and thereby it is suppressed for an electric field strength to become larger in comparison with a case where the sides 252 and 232 cross over each other at an acute angle as shown in FIG. 36(A).

Further, with respect to a line SA passing through between the sides 251 and 231, the sides 251 and 252 are symmetrical to the sides 231 and 232, respectively, resulting in that the direction of electric field vector between the sides 252 and 232 is parallel to that between the sides 251 and 231.

Accordingly, rapidly changing distribution of the transmittance near electrode crossover is alleviated, with the result that display image quality is improved and persistence degree is reduced. This holds at other electrode crossovers in a similar way.

Trial liquid crystal panels were fabricated in which the electrode patterns of FIG. 19 and FIG. 33 were employed both with the other conditions being the same as those of the above described trial example, and it was confirmed that the liquid crystal panel employing the electrode pattern of FIG. 19 has a lower persistence degree than that employing the electrode pattern of FIG. 33.

Fourth Embodiment

Figure 23:
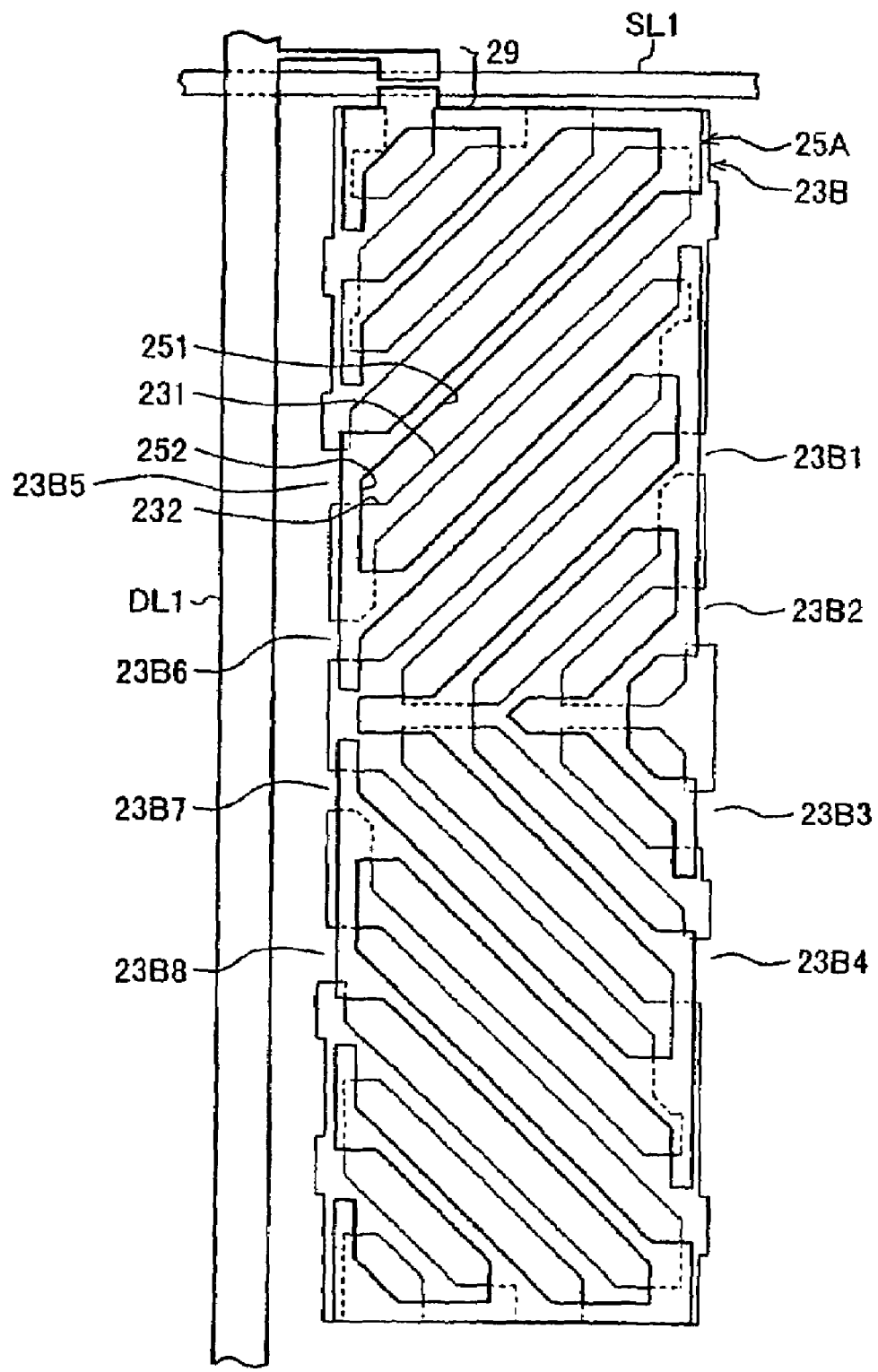
FIG. 23 is a plane view showing an electrode pattern of a liquid crystal pixel capable of reducing a persistence degree, of a fourth embodiment according to the present invention.
Figure 24:
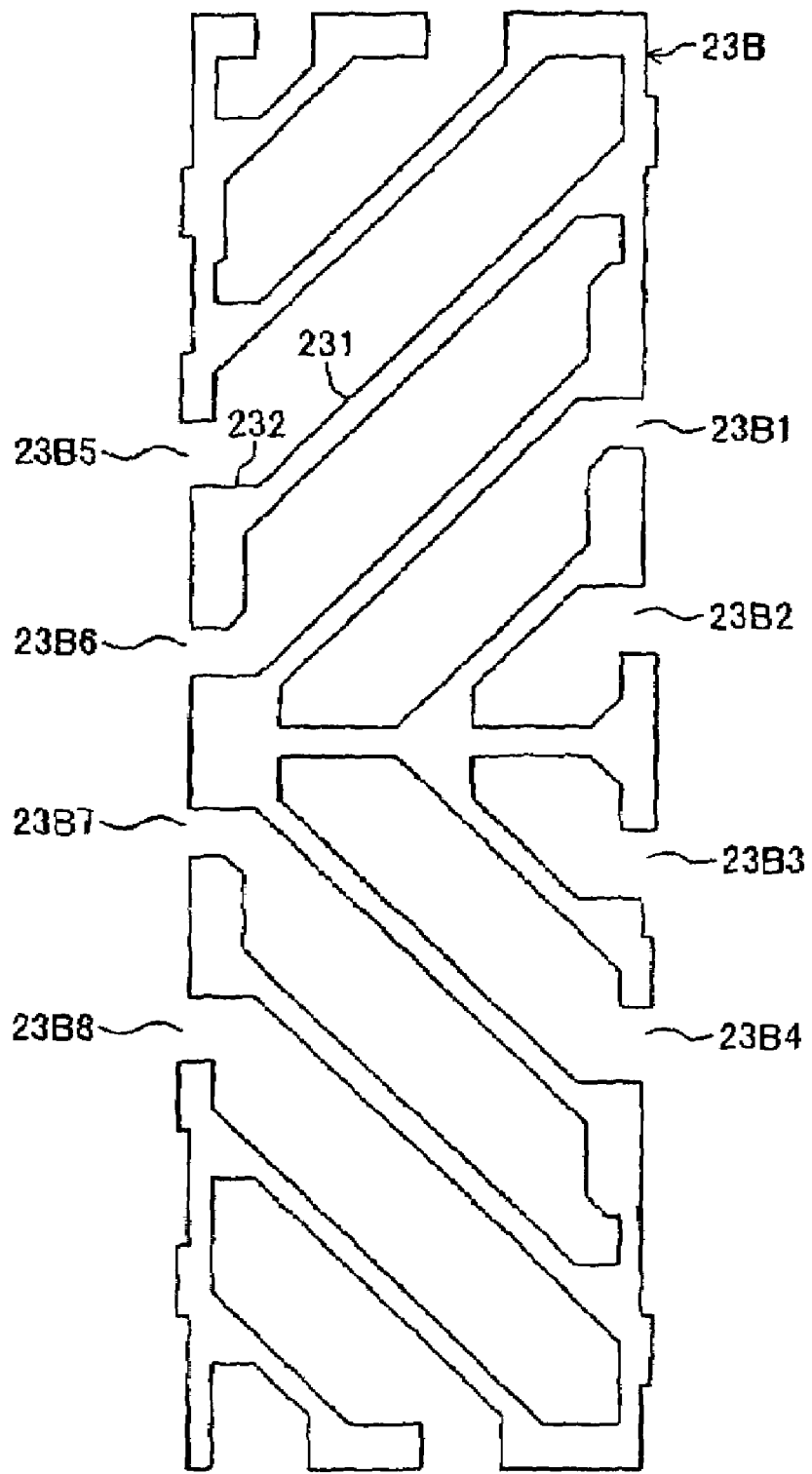
FIG. 24 is a plane view showing the common electrode of FIG. 23.

FIG. 23 is a plane view showing an electrode pattern of a liquid crystal pixel capable of reducing the persistence degree, of a fourth embodiment according to the present invention, which is analogous to FIG. 19. FIG. 24 is a plane view showing the common electrode 23B of FIG. 23, while the pixel electrode 25A is the same as that of FIG. 23.

In the peripheral section of the common electrode 23B, cutoff portions 23B1 to 23B8 are formed with ensuring one body of the common electrodes 23B. The positions of the cutoff portions 23B1 to 23B8 are each near crossovers between the common electrode 23B and the pixel electrode 25A.

In a case where non of these cutoff portions exist, an electric field arises in a non-display region between these portion and corresponding portions of the pixel electrode 25A when a voltage is applied, which affects orientation of liquid crystal molecules in a display region near the non-display region. This adverse influence is removed by the cutoff portions, resulting in improving a display image quality and reducing the persistence degree in comparison with that of the third embodiment.

Fifth Embodiment

Figure 25:
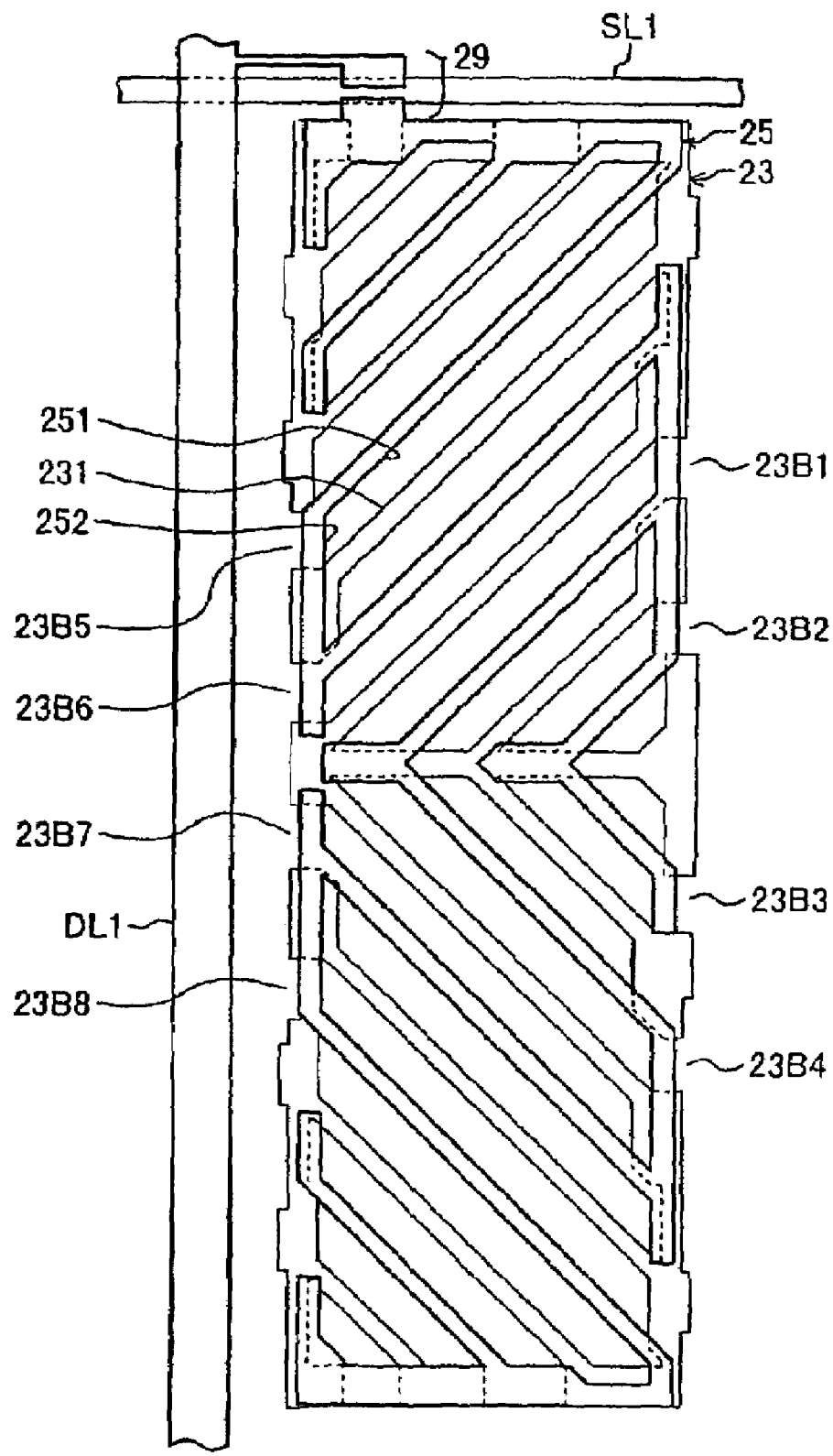
FIG. 25 is a plane view showing an electrode pattern of a liquid crystal pixel capable of reducing a persistence degree, of a fifth embodiment according to the present invention.
Figure 26:
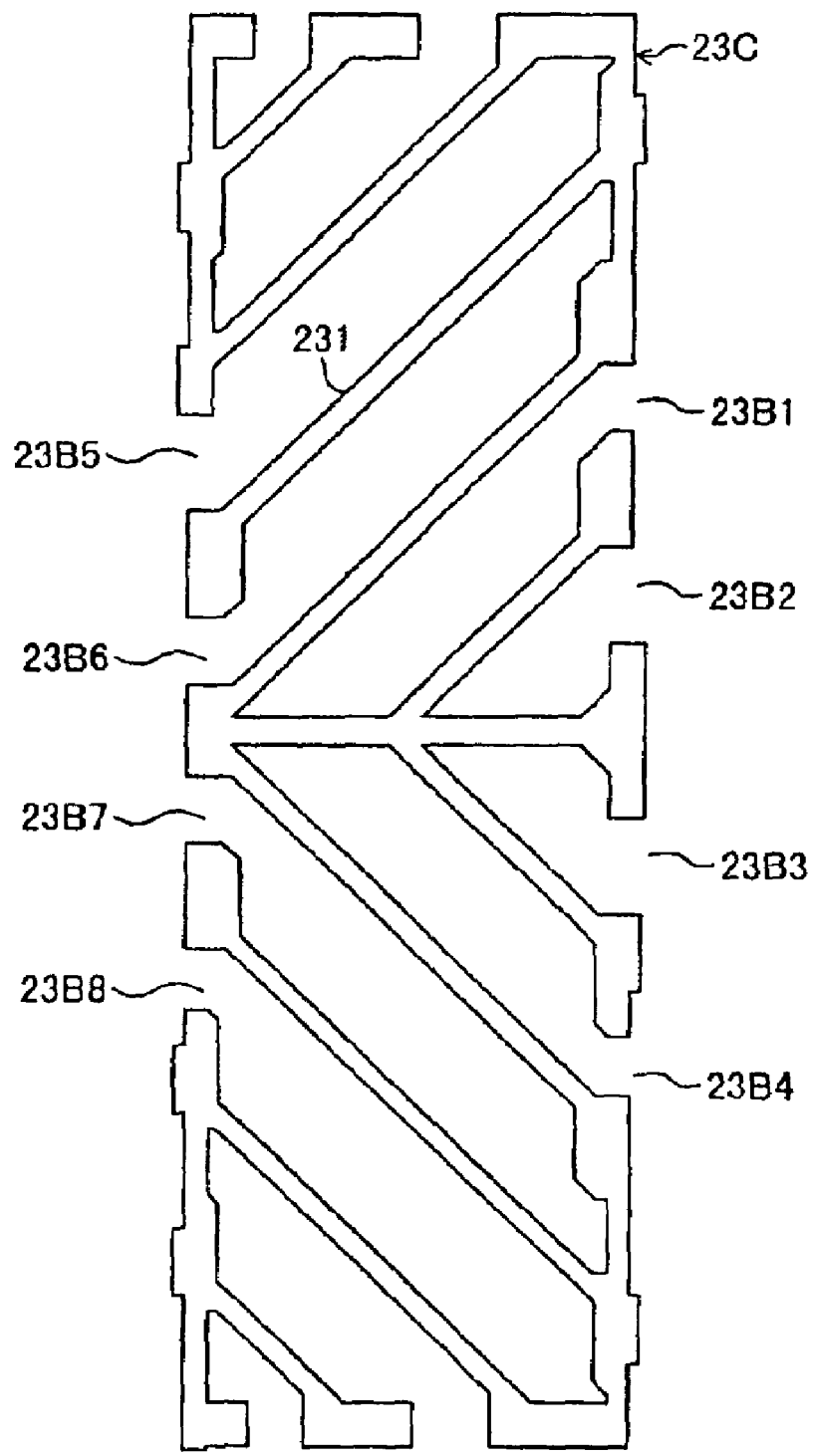
FIG. 26 is a plane view showing the common electrode of FIG. 25.

FIG. 25 is a plane view showing an electrode pattern of a liquid crystal pixel capable of reducing the persistence degree, of a fifth embodiment according to the present invention, which is analogous to FIG. 33. FIG. 26 is a plane view showing the common electrode 23C of FIG. 25, while the pixel electrode 25 is the same as that of FIG. 34.

In the common electrode 23C, cutoff portions 23B1 to 23B8 are formed with ensuring one body of the common electrodes 23C, resulting in improving a display image quality and reducing the persistence degree in comparison with the structure of FIG. 23 for the same reason as that of the above described fourth embodiment.

Sixth Embodiment

Figure 27:
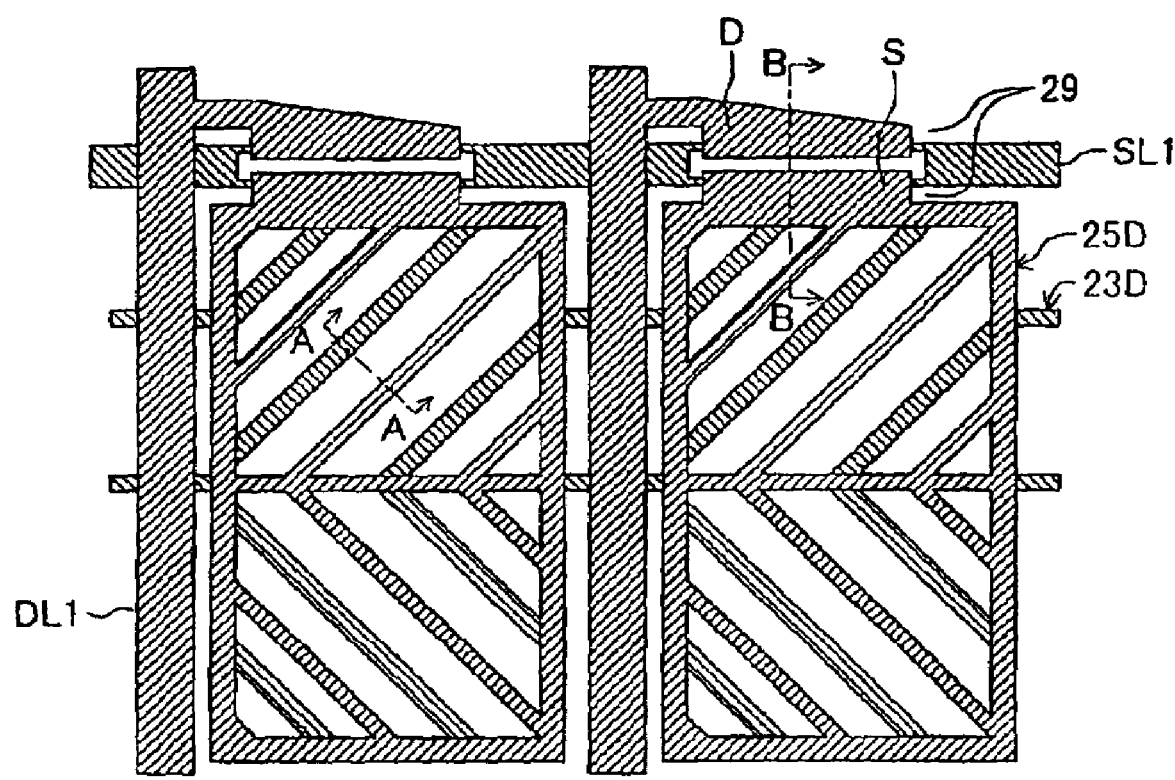
FIG. 27 is a plane view showing an electrode pattern of two liquid crystal pixels adjacent to each other, of a sixth embodiment according to the present invention.

FIG. 27 is a plane view showing an electrode pattern of two liquid crystal pixels adjacent to each other, of a sixth embodiment according to the present invention, wherein the both pixels have the same pattern.

The frame sections of a common electrode 23D and a pixel electrode 25D overlap each other with an insulating layer interposing therebetween. The stripe electrode section of the common electrode 23D are formed under and between stripe electrodes of the pixel electrode 25D, and therefore the line density of the stripe electrode sections of the common electrode 23D is two times greater than that of the pixel electrode 25D.

Figure 28:
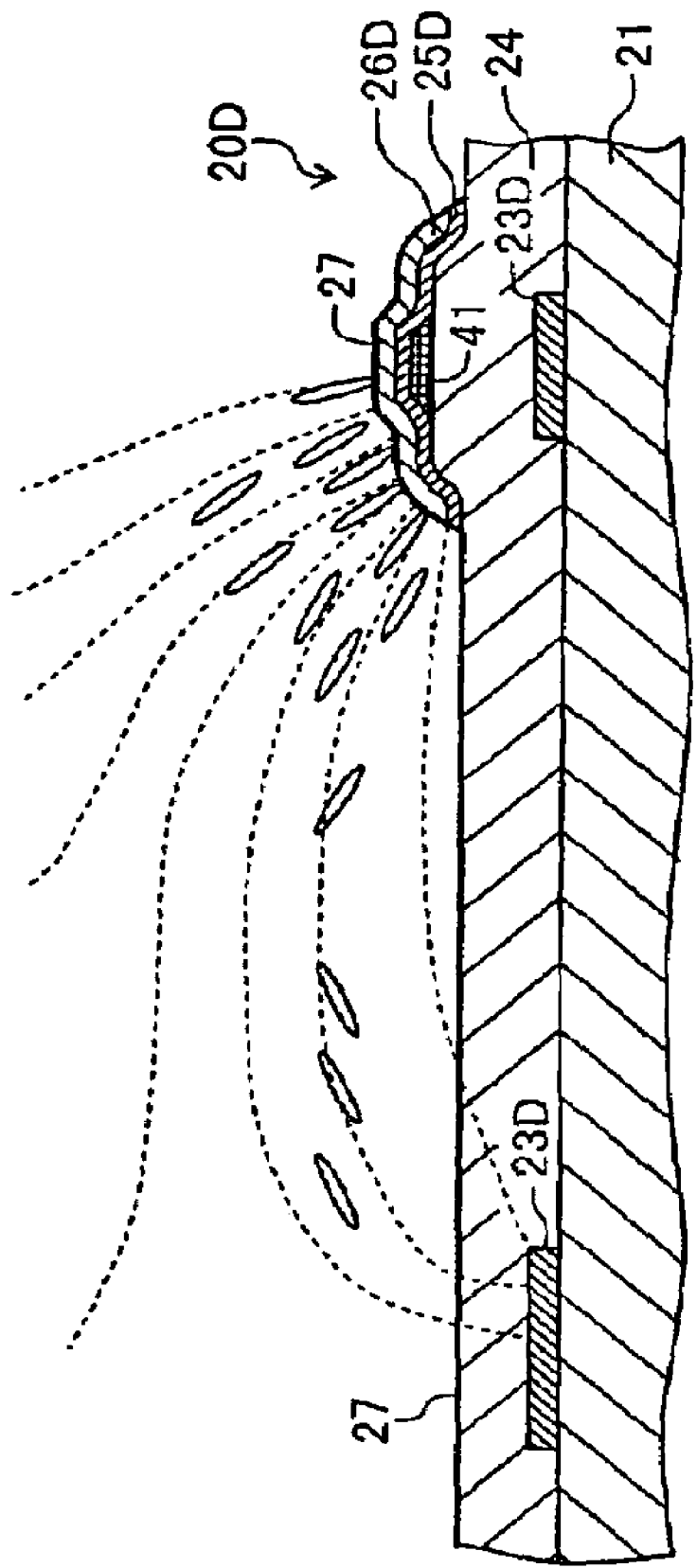
FIG. 28 is an enlarged sectional view taken along line A-A of FIG. 27.

FIG. 28 is an enlarged sectional view taken along line A-A of FIG. 27.

Figure 32:
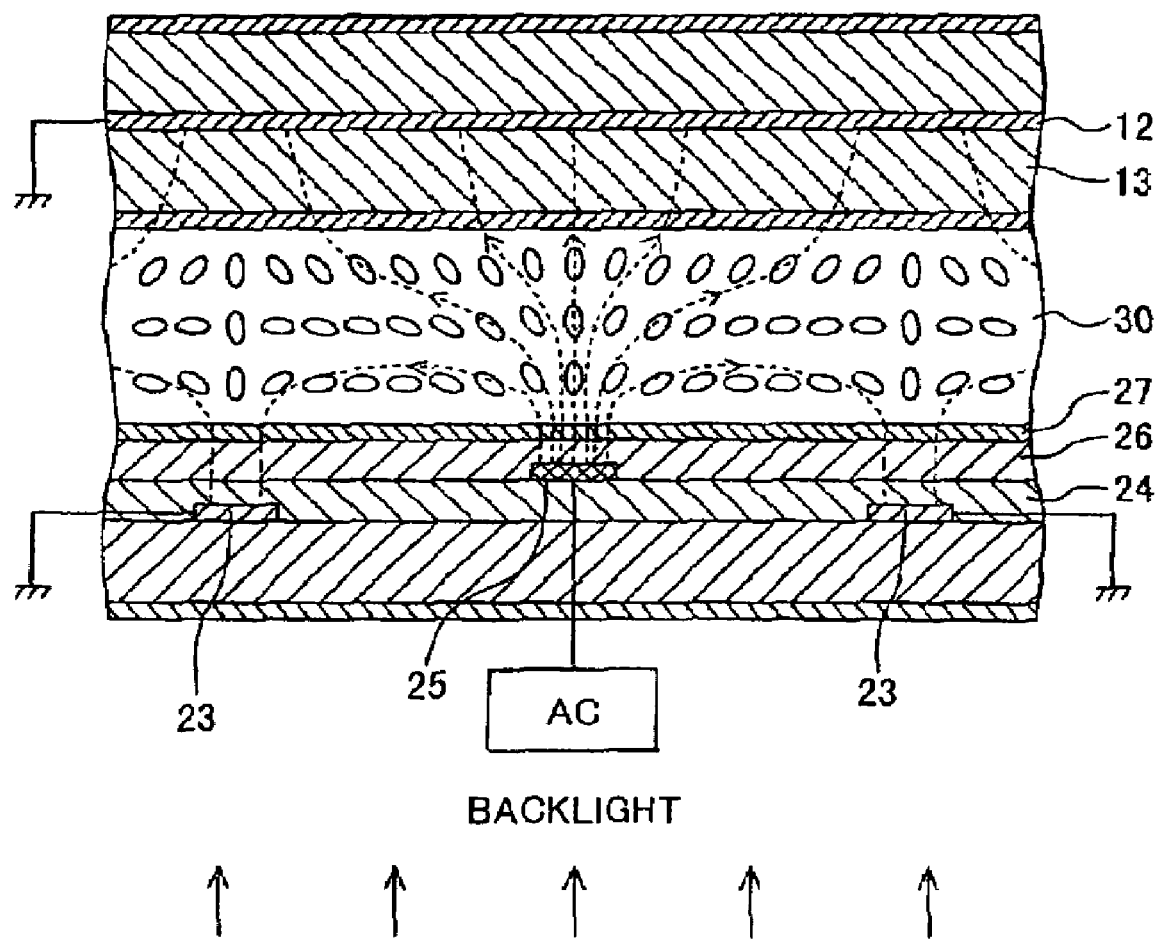
FIG. 32 is a schematic sectional view showing the pixel of FIG. 31 in a state where a voltage is applied.

Different points from the liquid crystal pixel of FIG. 32 are that the stripe electrodes of the pixel electrode 25D are convex in cross section, and an insulating layer 26D is formed only on the stripe electrodes of the pixel electrode 25D and no insulating layer is formed on display areas between stripe electrodes of the common electrode 23D and the pixel electrode 25D. A vertically oriented layer 27 is thinner than the insulating layer 26D, therefore it is depicted with a thick line in FIG. 28.

Since the stripe electrodes of the pixel electrode 25D are convex in cross section, the top surface thereof is sloped toward both sides with the maximum height at the middle. In order to form such a convex shape, unlike FIG. 32, there is formed a stripe electrode of the common electrode 23D under each stripe electrode of the pixel electrode 25D, wherein this stripe electrode of the common electrode 23D has a narrower width than that of the pixel electrode 25D. In order to emphasize this convex shape, a channel protective layer 41 is partially removed with leaving portions over the stripe electrodes of the common electrode 23D, wherein the channel protective layer 41 is formed when the TFT 29 of FIG. 27 is formed, and has a width narrower than that of the underlying stripe electrode.

With such a structure having a convex shape in cross section, the lines of electric force becomes as shown with dotted lines in FIG. 28 when a voltage is applied between the pixel electrode 25D and the common electrode 23D. That is, since the lines of electric force near a slope of the pixel electrode 25D are normal to the slope, inclination of liquid crystal molecules relative to a normal to the surface of the substrate 21 becomes larger, which increases a transmittance in white display in comparison with the case of FIG. 32, thereby improving a display contrast.

Further, since the patterns of the pixel electrode 25D and the insulating layer 26D are the same as each other, and no insulating layer 26D exists in display areas between the stripe electrodes of the pixel electrode 25D and the common electrode 23D, an electric field is more effectively used on liquid crystal molecules in comparison with the case of FIG. 32, resulting in improving a display contrast in comparison with the case of FIG. 32 under the same applied voltage.

Furthermore, since liquid crystal molecules do not directly contact with the pixel electrode 25D, decomposition of liquid crystal molecules are prevented, and the persistence degree is also reduced.

Figure 29A:
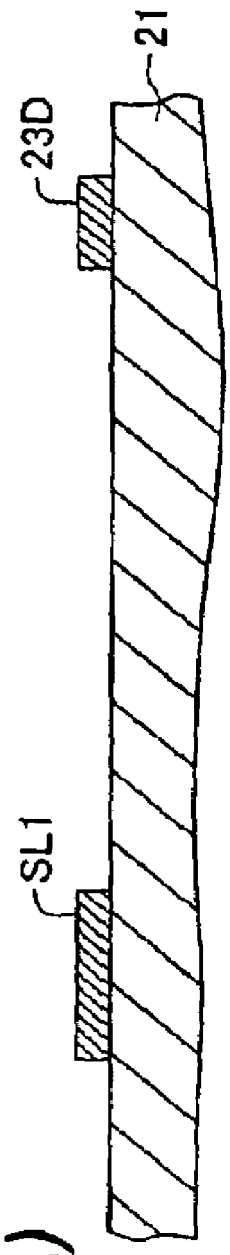
FIGS. 29(A)-29(C) are schematic sectional views showing a fabrication process of a substrate on the back light incident side.
Figure 29B:
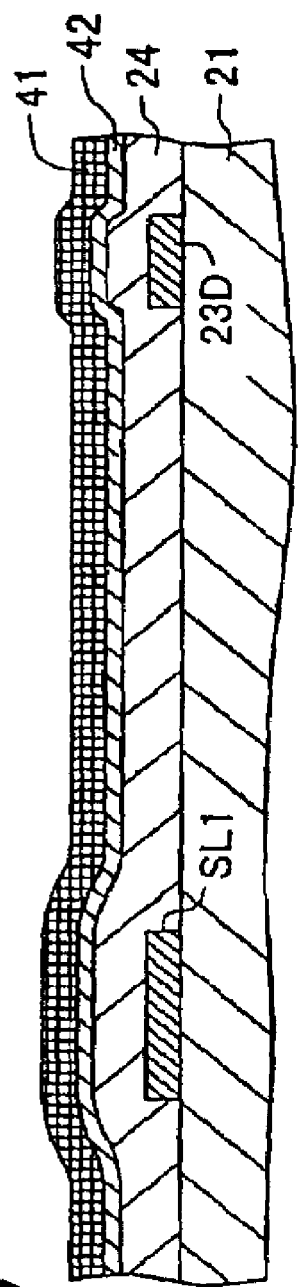
Figure 29C:
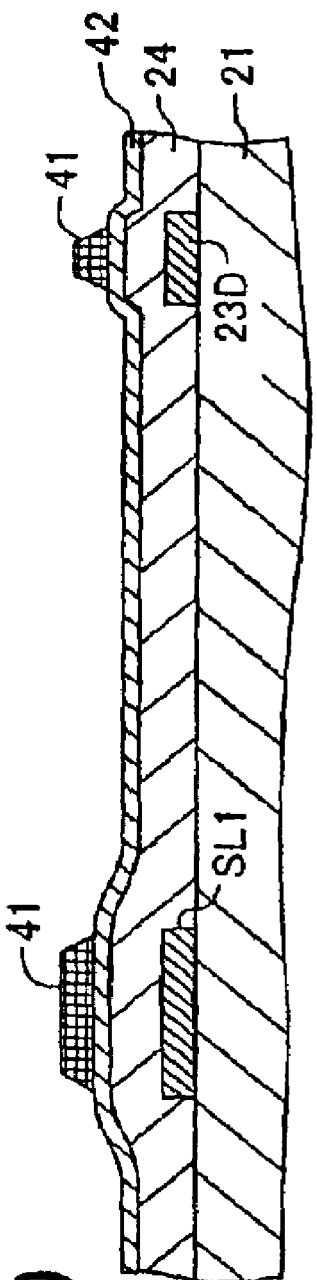
Figure 30A:
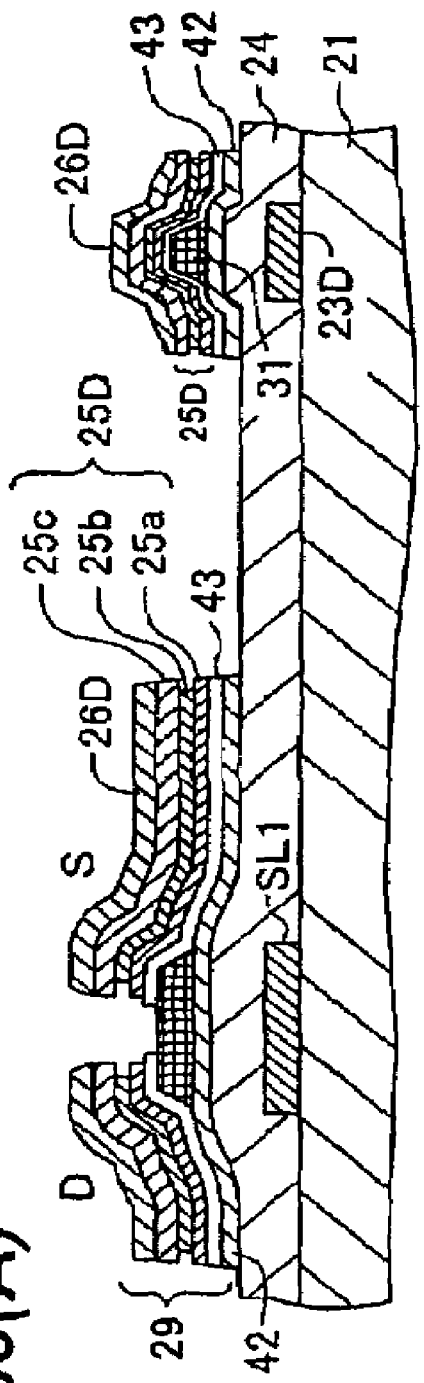
FIGS. 30(A)-30(B) are schematic sectional views showing the fabrication process following FIG. 29.
Figure 30B:
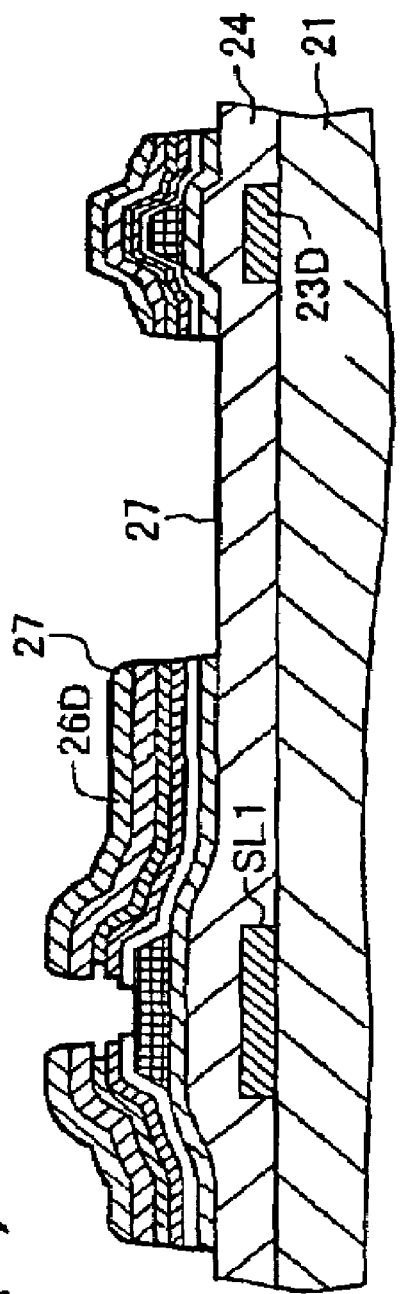

FIGS. 29 and 30 are schematic sectional views showing a fabrication process of a substrate 20D on the back light incident side, and each section corresponds to one taken along line B-B of FIG. 27. There will be described below the fabrication process.

(A) A common electrode 23D and a scan (gate) line SL1 both made of metal are formed on a substrate 21 by photolithography.

(B) There are formed on the substrate 21 an insulating layer 24, an intrinsic semiconductor layer 42, and a channel protective layer 41. (C) The channel protective layer 41 is partially removed with leaving portions only over the scan line SL1 and the common electrode 23D by photolithography.

(D) An n+ semiconductor layer 43, a conductive layer 25D and an insulating layer 26D are formed on the semiconductor layer 42, and these layers are etched into the same pattern not only to form the source S and drain D of TFT 29 over the scan line SL1 but also to simultaneously form the stripe electrodes of the pixel electrode 25D and the insulating layer 26D over stripe electrodes of the common electrode 23D. The conductive layer 25D has conductive layers 25a, 25b and 25c, for example, Ti/Al/Ti. If only the Al layer is used as the electrode 25D, the Al diffuses into the n+ semiconductor layer 43, therefore a Ti layer is used in order to avoid this diffusion, while if only the Ti layer is used, a resistance value becomes large, and therefore the Al layer is also used. The insulating layer 26D is a silicon nitride layer or a silicon oxide layer formed by means of DVD.

Note that if the two layer structure of Ti/Al is used as the pixel electrode 25D and aluminum nitride is used as the insulating layer 26D, these layers can be continuously grown by a sputter device, resulting in reducing the number of steps of the fabrication process. Further, as the insulating layer 26D, a photoresist used for patterning may be left over the stripe electrodes of the common electrode 23D.

(E) A vertically oriented layer 27 drawn with a thick line in FIG. 30 is coated on the insulating layers 24 and 26.

According to the six embodiment, since by forming the TFT 29, the stripe electrodes, each having a convex shape in cross section, of the pixel electrode 25D and the insulating layer 26D thereon are also formed simultaneously, there is no need to increase the steps of fabrication process in order to form the pixel electrode 25D and the insulating layer 26D.

Although preferred embodiments of the present invention has been described, it is to be understood that the invention is not limited thereto and that various changes and modifications may be made without departing from the spirit and scope of the invention.

What is claimed is:

1. A liquid crystal panel development method, said liquid crystal panel comprising: first and second substrate, said first substrate including a first electrode, said first or second substrate including a second electrode, said first and second electrode being for a display voltage to be applied therebetween; and liquid crystal interposed between said first and second substrates; said method comprising the steps of:

applying a voltage signal between said first electrode and said second electrode, said voltage signal being composed of an AC voltage component and a DC voltage component Vdc, said AC voltage component having an amplitude Vac;

changing said amplitude Vac and said DC voltage component Vdc to measure the range of optimal DC component variation ΔVdc; and determining a structure or material of said liquid crystal panel such that said range of optimal DC component variation ΔVdc becomes less than a given value;

wherein said range of optimal DC component variation ΔVdc is defined as ΔVdc=|Vdcb−Vdcw|, wherein Vdcb is a value of said DC voltage component Vdc at which a range of transmittance variation is the minimum when said DC voltage component Vdc is changed with said amplitude Vac being fixed at a value for displaying black, wherein Vdcw is a value of said DC voltage component Vdc at which a range of transmittance variation is the minimum when said DC voltage component Vdc is changed with said amplitude Vac being fixed at a value for displaying white.

2. The liquid crystal panel development method of claim 1, wherein said given value is equal to or less than 0.5 V.

* * * * *